(12) United States Patent
Akaike et al.

(10) Patent No.: US 10,235,790 B2
(45) Date of Patent: Mar. 19, 2019

(54) DISPLAY CONTROL APPARATUS, DISPLAY CONTROL METHOD, AND COMPUTER PROGRAM PRODUCT

(71) Applicants: Mana Akaike, Tokyo (JP); Nobuyuki Kishi, Tokyo (JP)

(72) Inventors: Mana Akaike, Tokyo (JP); Nobuyuki Kishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/929,014

(22) Filed: May 14, 2018

(65) Prior Publication Data

US 2018/0336712 A1 Nov. 22, 2018

(30) Foreign Application Priority Data

May 19, 2017 (JP) .................................. 2017-100397

(51) Int. Cl.
*G06T 13/20* (2011.01)

(52) U.S. Cl.
CPC .................................... *G06T 13/20* (2013.01)

(58) Field of Classification Search
None
See application file for complete search history.

(56) References Cited

U.S. PATENT DOCUMENTS

2008/0242429 A1 10/2008 Itoh et al.

FOREIGN PATENT DOCUMENTS

JP 2009-101122 5/2009

*Primary Examiner* — Michelle Chin
(74) *Attorney, Agent, or Firm* — Oblon, McClelland, Maier & Neustadt, L.L.P.

(57) ABSTRACT

A display control apparatus includes circuitry. The circuitry receives a user image input to the display control apparatus, the user image including a portion drawn by a user. The circuitry generates a first image based on the user image, the first image being obtained by diffusing one or more pixels of a plurality of pixels defining the user image in time series. The circuitry generates a second image based on the user image, the second image is an image based on which a figure pattern of the user is identifiable and that includes a contour of the user image. The circuitry displays the second image at one position on a screen. The circuitry displays the first image at a counter position of the one position displaying the second image on the screen, the first image being superimposed on the second image.

16 Claims, 28 Drawing Sheets

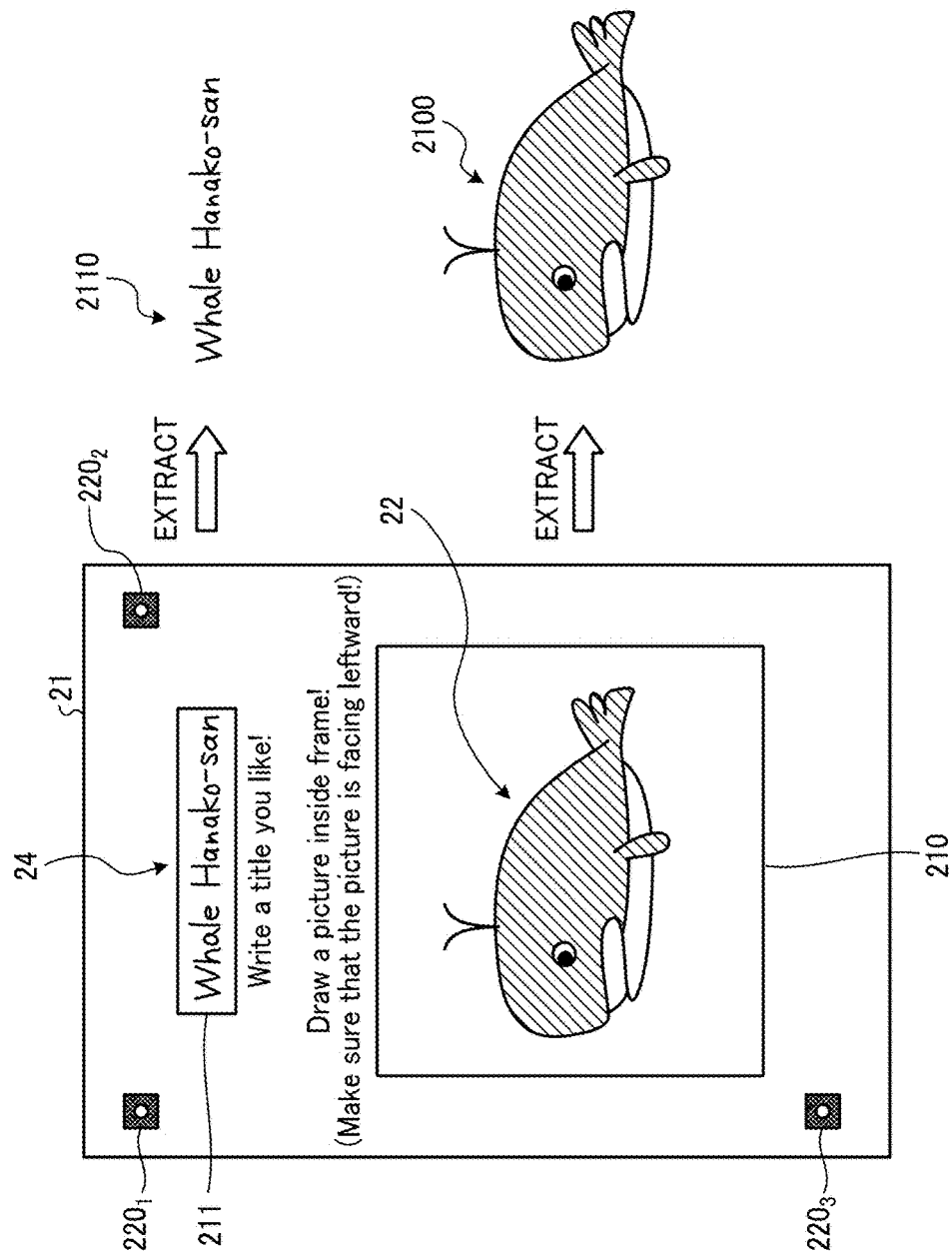

← 310a

← 310b

← 310c

← 310d

← 310e

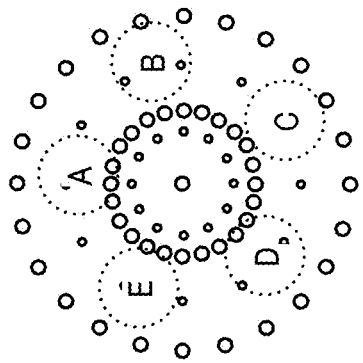
FIG. 21A
WATERFALL
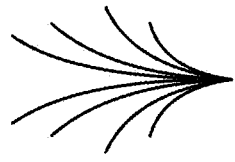
FIG. 21B
MINE
FIG. 21C
SHAKUDAMA
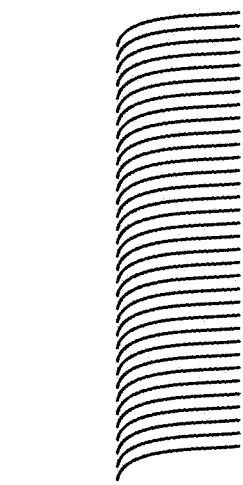
FIG. 21D
SYMMETRY
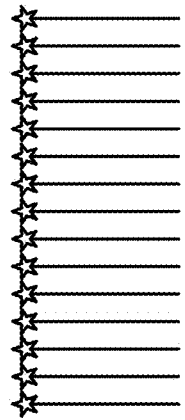
FIG. 21E
V-SHAPED SHOOTING
FIG. 21F
PARALLEL SHOOTING

FIG. 22

| FIG. 22A |
| FIG. 22B |

FIG. 22A

| SCENARIO | APPEARING FIREWORKS AND FLOW | TIME (SECONDS) | HD, NUMBER OF FIREWORKS SHOOTINGS | WIDE, NUMBER OF FIREWORKS SHOOTINGS |
|---|---|---|---|---|
| Niagara | 1. Black | 3 | | |
| | 2. Chrysanthemum, shooting-up | 10 | Chrysanthemum3 | Chrysanthemum5 |
| | 3. Black | 5 | | |
| | 4. Waterfall (+ latter 20 seconds, Peony, shooting-up & normal) | 25 | Peony5 | Peony5 |
| | 5. Fade-out, black | 5 | | |
| Star-mine A | 1. Black | 3 | | |
| | 2. Saturn | 10 | Saturn3 | Saturn5 |
| | 3. Mine + Multi-break shell | 20 | Multi-break shell3 | Multi-break shell5 |
| | 4. Peony, multiple shootings, symmetry | 20 | Peony7 | Peony9 |
| | 5. Black | 5 | | |
| Star-mine B | 1. Diagonal shooting-up crossing peony | 10 | Peony6 | Peony8 |
| | 2. Mine + Peony, multiple shootings, symmetry A | 15 | Peony5 | Peony9 |
| | 2. Mine + Peony, multiple shootings, symmetry B | 15 | Peony5 | Peony9 |
| | 8. Fade-out, black | 3 | | |
| Shakudama | 1. Black | 0 | | |
| | 2. Multi-break shell + Normal | 10 | Multi-break shell3 | Multi-break shell5 |
| | 3. Black | 5 | | |
| | 3. Shakudama, Willow | 30 | Shakudama Willow3 | Shakudama Willow3 |
| | 4. Fade-out, black | 5 | | |

FIG. 22B

| Multiple Shootings in a Row | 1. Black | | | |
| --- | --- | --- | --- | --- |
| | 2. Poeny, Shooting-up in Row | 10 | Peony7 | Peony9 |
| | 3. Poeny, Shooting-up in Row (Shifted timing) | 10 | Peony7 | Peony9 |
| | 4. Poeny, Shooting-up in Row (Symmetry & Picture rotation) | 10 | Peony7 | Peony9 |
| | 5. Willow, Multiple shootings | 20 | Willow6 | Willow6 |
| | 6. Fade-out, black | 5 | | |
| Mine | 1. Black | 3 | | |
| | 2. Willow, shooting-up | 10 | Willow3 | Willow5 |
| | 3. Mine + Diagonal Peony | 10 | Mine1, Peony6 | Mine1, Peony8 |
| | 4. Mine + Diagonal Saturn | 10 | Mine1, Saturn6 | Mine1, Saturn8 |
| | 5. Mine + Diagonal Peony | 10 | Mine1, Peony6 | Mine1, Peony8 |
| | 6. Fade-out, black | 5 | | |

DISPLAY CONTROL APPARATUS, DISPLAY CONTROL METHOD, AND COMPUTER PROGRAM PRODUCT

CROSS-REFERENCE TO RELATED APPLICATION

This patent application is based on and claims priority pursuant to 35 U.S.C. § 119(a) to Japanese Patent Application No. 2017-100397, filed on May 19, 2017, in the Japan Patent Office, the entire disclosure of which is hereby incorporated by reference herein

BACKGROUND

Technical Field

The present disclosure relates to a display control apparatus, a display control method, and a computer program product.

Description of the Related Art

A recent improvement in the performance of computer devices makes it possible to easily display images using computer graphics that use three-dimensional coordinates. The computer graphics using three-dimensional coordinates may be referred to as simply "3D CG" hereinafter. In the 3D CG, it is common that regular or random movement is set to each object arranged in the three-dimensional coordinate space to render a moving image. In such moving image, it is possible to make a presentation as if each object dependently moves in the three-dimensional coordinate space.

Further, a technique is known that gives movement to an image drawn by an animation creator by handwriting with respect to an image of 3D CG, and display an image obtained by combining the 3D CG image with a background image that is prepared in advance.

On the other hand, in a case where an image created by a user is arranged and moved in a three-dimensional coordinate space, if a mechanism is provided that not only makes the image drawn by the user move in the three-dimensional coordinate space but also allows the user to have greater expectations and curiosity, the user will gain greater value. The user is less likely to have much interest in the movement of image drawn by the user, if that movement is monotonous to the user.

SUMMARY

A display control apparatus includes circuitry. The circuitry receives a user image input to the display control apparatus, the user image including a portion drawn by a user. The circuitry generates a first image based on the user image, the first image being obtained by diffusing one or more pixels of a plurality of pixels defining the user image in time series. The circuitry generates a second image based on the user image, the second image is an image based on which a figure pattern of the user is identifiable and that includes a contour of the user image. The circuitry displays the second image at one position on a screen. The circuitry displays the first image at a counter position of the one position displaying the second image on the screen, the first image being superimposed on the second image.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 9 is a diagram illustrating an example of the sheet on which a picture and a title are drawn, according to the first embodiment of the present disclosure;

FIGS. 21A to 21F are diagrams, each illustrating an example of a display pattern according to which the composite image displayed, according to a second embodiment of the present disclosure;

FIGS. 22A and 22B are a table of an example scenario, according to a second embodiment of the present disclosure;

Figure 1:
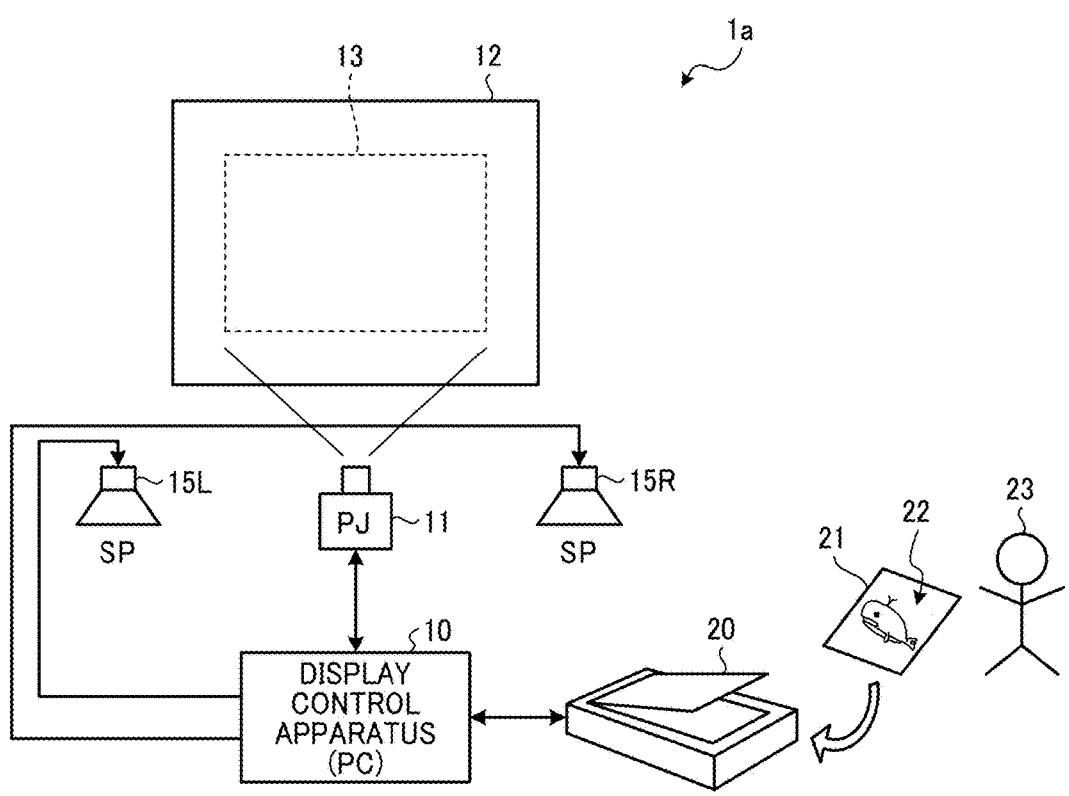
FIG. 1 is a schematic diagram illustrating a display system according to a first embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a description is given of embodiments of a display control apparatus, a display control method, and a computer program product, with reference to drawings.

First Embodiment

FIG. 1 is a schematic diagram illustrating a display system $1a$ according to a first embodiment of the present disclosure. In FIG. 1, the display system $1a$ includes, for example, a display control apparatus 10, a projector 11, which is an example of a display device, and a scanner 20. The display control apparatus 10 is, for example, a personal computer. The display control apparatus 10 obtains display image data by performing predetermined image processing on image data obtained by scanning an image on a sheet 21 using the scanner 20. The display control apparatus 10 outputs the display image data to the projector 11. The projector 11 projects an image 13 according to the display image data output from the display control apparatus 10 onto a screen 12, which is an example of a display medium.

In an example of FIG. 1, the display system $1a$ further includes, for example, speakers 15L and 15R on the left and right sides of the screen 12. The display control apparatus 10 outputs sound signals as left and right channel stereo sound signals. The sound signals of the left channel are output to the speaker 15L, and the sound signals of the right channel are output to the speaker 15R.

Figure 2:
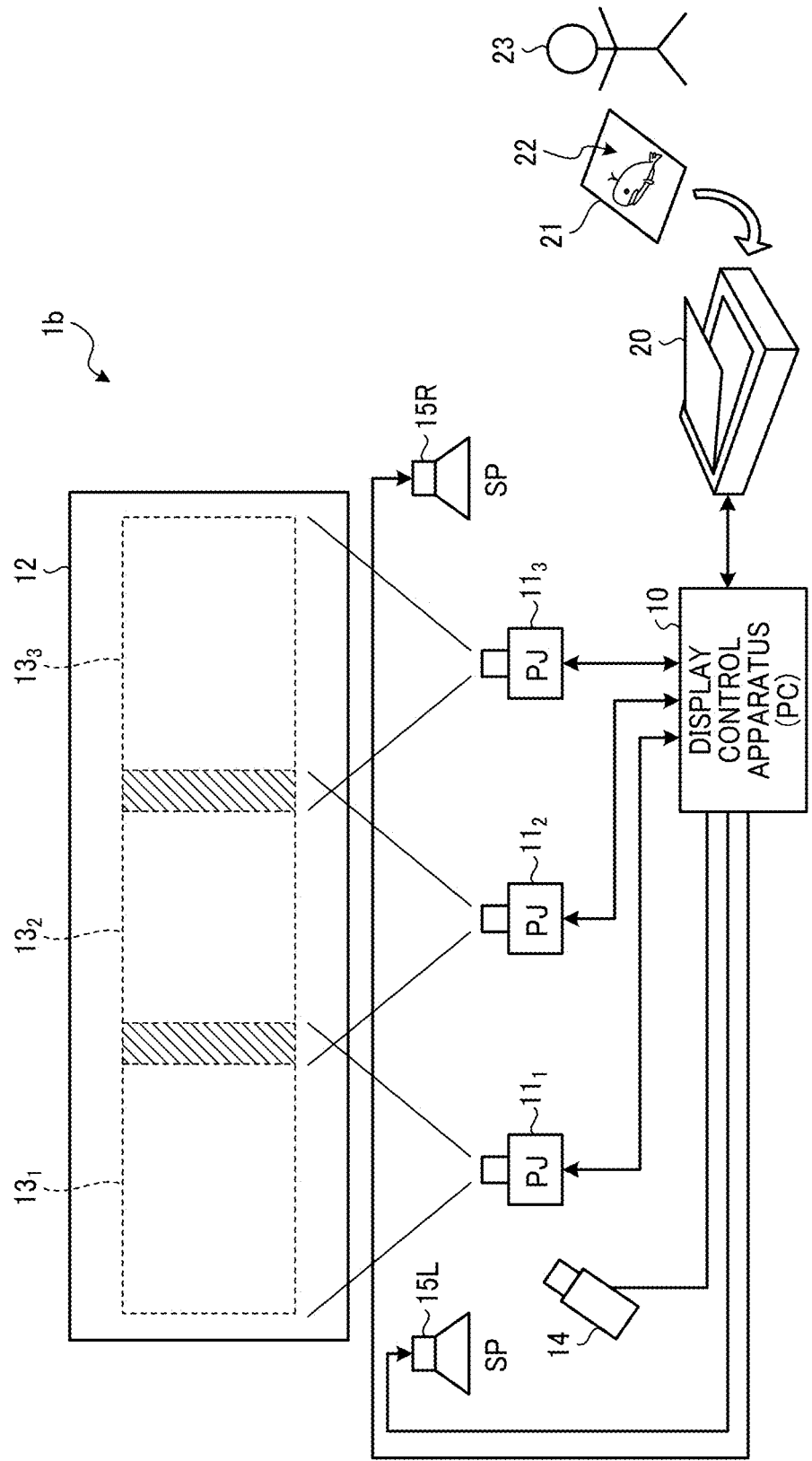
FIG. 2 is a block diagram illustrating an example of a display system including three projectors, according to the first embodiment of the present disclosure.

In an example of FIG. 1, the display system $1a$ includes, for example, a single projector 11 as an example of display device for displaying an image according to the display image data. In another example, the display system $1a$ may include a plurality of display devices. FIG. 2 illustrates an example of a display system $1b$ applicable to the first embodiment, which includes three projectors $11_1$, $11_2$, and $11_3$, each being an example of a display device.

In the display system $1b$, the display control apparatus 10 outputs the display image data to each of the three projectors $11_1$, $11_2$, and $11_3$. According to the display image data output from the display control apparatus 10, the projectors $11_1$, $11_2$, and $11_3$ project images $13_1$, $13_2$, and $13_3$ onto the screen 12, which is an example of a display medium.

As illustrated in FIG. 2, in the case where plural projectors $11_1$, $11_2$ and $11_3$ project plural images $13_1$, $13_2$ and $13_3$ to the single screen 12, it is preferable that the images $13_1$, $13_2$ and $13_3$ are adjacent to each other as having overlapping regions. In the example of FIG. 2, the images $13_1$, $13_2$ and $13_3$ projected on the screen 12 are captured by a camera 14. Based on image data of the images captured by the camera 14, the display control apparatus 10 controls the images $13_1$, $13_2$ and $13_3$ or the projectors $11_1$, $11_2$ and $11_3$ to adjust images of the overlapping regions.

When a single projector 11 is used as illustrated in FIG. 1, a screen formed by the image 13 projected by the projector 11 is referred to as a High Definition (HD) screen. The HD screen has a resolution of 1920 pixels×1080 pixels, for example. By contrast, as illustrated in FIG. 2, when three projectors $11_1$, $11_2$ and $11_3$ are used, a screen formed by combing the images $13_1$, $13_2$ and $13_3$ projected by the projectors $11_1$, $11_2$ and $11_3$ excluding the overlapping regions is referred to as a wide screen. The wide screen has a resolution of 3840 pixels×800 pixels, for example.

In the example of FIG. 1, in alternative to the projector 11, a display of a computer may be used, for example, as the display device for displaying an image according to the display image data outputted from the display control apparatus 10.

Hereinafter, a description is given of the display system $1a$ of FIG. 1 that uses a single display device (projector 11), unless otherwise described.

In the configuration of FIG. 1, for example, a user 23 draws a picture 22 by hand on a sheet 21. The scanner 20 scans an image drawn on the sheet 21. The scanner 20 outputs document image data obtained by scanning the image on the sheet 21, to the display control apparatus 10. The display control apparatus 10 extracts image data of a design portion, that is, image data of a portion corresponding to the picture 22, from the document image data received from the scanner 20. Further, the display control apparatus 10 stores the extracted image data as user image data, which is a target of display processing.

In the first embodiment, the display control apparatus 10 outputs, to the projector 11, image data obtained by combining image data generated based on the user image data and firework image data stored in advance in the display control apparatus 10 with background image data for displaying a background image. The projector 11 projects the image 13 generated based on this image data output from the display control apparatus 10 onto the screen 12. The firework image data is image data simulating shooting of fireworks. For example, the firework image data is image data representing, by animation, a burst of a firework shell (pyrotechnic ball) containing gunpowder and dispersal of sparks. By using an image of the night sky as the background image, for example, it is possible to display the image 13, which is an image (moving image) simulating the shooting of fireworks, on the screen 12.

In the following, "image data" is referred to as "image" in order to simplify the description, unless otherwise described.

Figure 3:
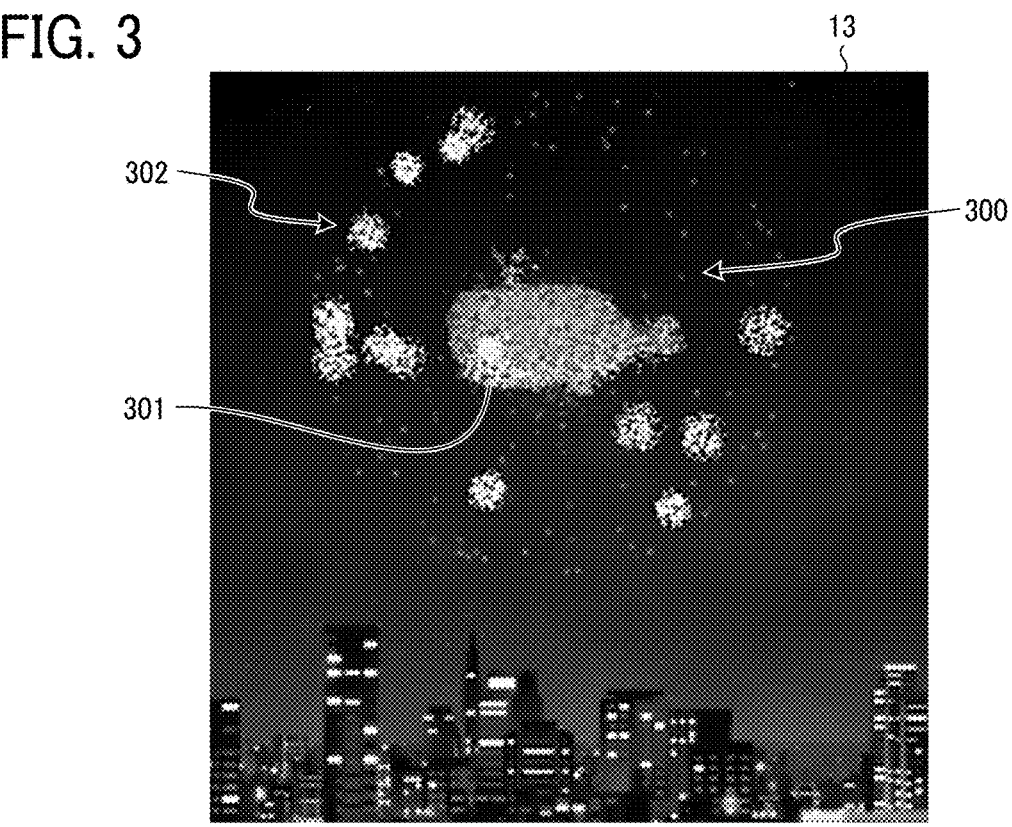
FIG. 3 illustrates an example of an image in which an image including an image based on a user image and a firework image is arranged on a background image, according to the first embodiment of the present disclosure.

FIG. 3 illustrates an example of the image 13 in which an image 300 including the image based on the user image and the firework image is arranged on the background image, according to the first embodiment. In the image 300, an image 301 of a "whale" arranged in the center portion is the image based on the user image. Further, an image 302 of dispersed light spots and a plurality of light spot sets arranged in the periphery of the image 301 is the firework image. This firework image simulates fireworks called "multi-break shells" from among plural types of fireworks.

In displaying this image 300, the display control apparatus 10 superimposes a first image on a second image. The first image is a moving image obtained by diffusing one or more pixels of pixels constituting the user image. The second image is an image based on the user image. Based on the second image, a figure pattern of the user image can be identified, and the second image includes a contour of the user image. The display control apparatus 10 further superimposes the firework image (third image) on the image obtained by superimposing the first image on the second image, to obtain a combined image. The display control apparatus 10 arranges the combined image on the background image.

By displaying the first image together with the third image as described above, it is possible to make the user image appear as if it is a part of the firework image. Furthermore, by superimposing the first image on the second image, a user (or a viewer) can easily recognize a figure pattern of the user image.

In the first embodiment, the display control apparatus 10 generates an image data space in a three-dimensional orthogonal coordinate system having three coordinate axes (x-axis, y-axis, z-axis) orthogonal to each other. The display control apparatus 10 gives coordinates of this generated image data space to each of the first image, the second image and the third image. Accordingly, the image data of the first image, the second image and the third image are set as data in the generated image data space.

Figure 4:
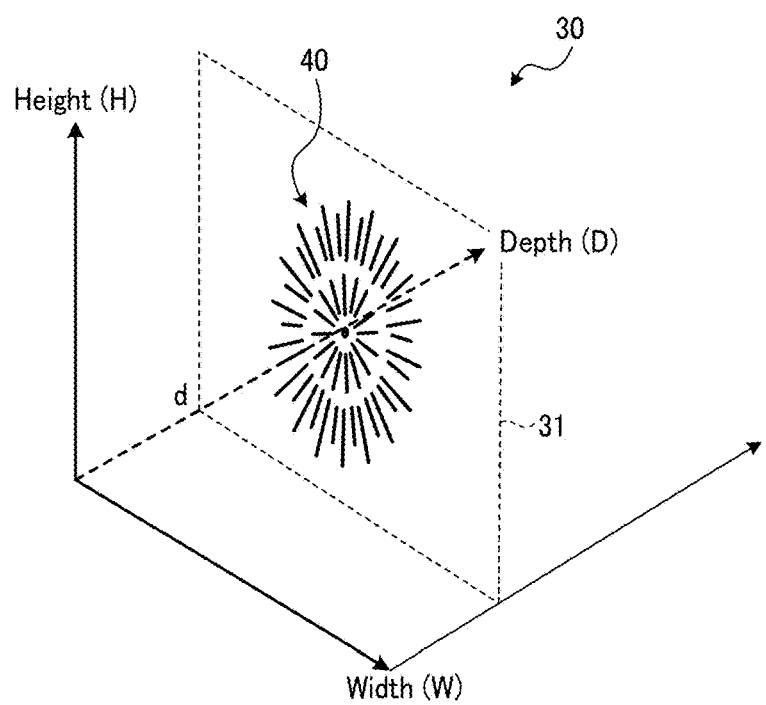
FIG. 4 is a schematic diagram illustrating an image data space generated by a display control apparatus, according to the first embodiment of the present disclosure.

FIG. 4 is a schematic diagram illustrating the image data space generated by the display control apparatus 10, according to the first embodiment. In an example of FIG. 4, a description is given assuming that the x-axis, the y-axis and the z-axis are axes of a height H, a width W and a depth direction (depth D), respectively. The display control apparatus 10 generates an image data space 30 having a three-dimensional coordinate system configured by the axes of the height H, the width W, and the depth D. In the example of FIG. 4, an object 40 based on the image data of the firework image (third image) is included in this image data space 30.

In this disclosure, an object refers to image data other than the background image in the three-dimensional image data space. In other words, examples of the object include image data of the first image, the second image and the third image.

In FIG. 4, the object 40 is placed on an x-y plane (HW plane) 31 whose position in the depth direction is fixed at the depth d. An object based on the image data of the first image and an object based on the image data of the second image are also arranged on the xy plane 31 at the depth d, in substantially the same manner as the object 40. In this case, the object based on the image data of the first image is superimposed on the object based on the image data of the second image. In other words, when it is assumed that a side where the screen 12 is installed is a back side and a side where the user (viewer) viewing the image 13 projected on the screen 12 is present is a front side, the first image is displayed on the front side of the second image.

Figure 5:
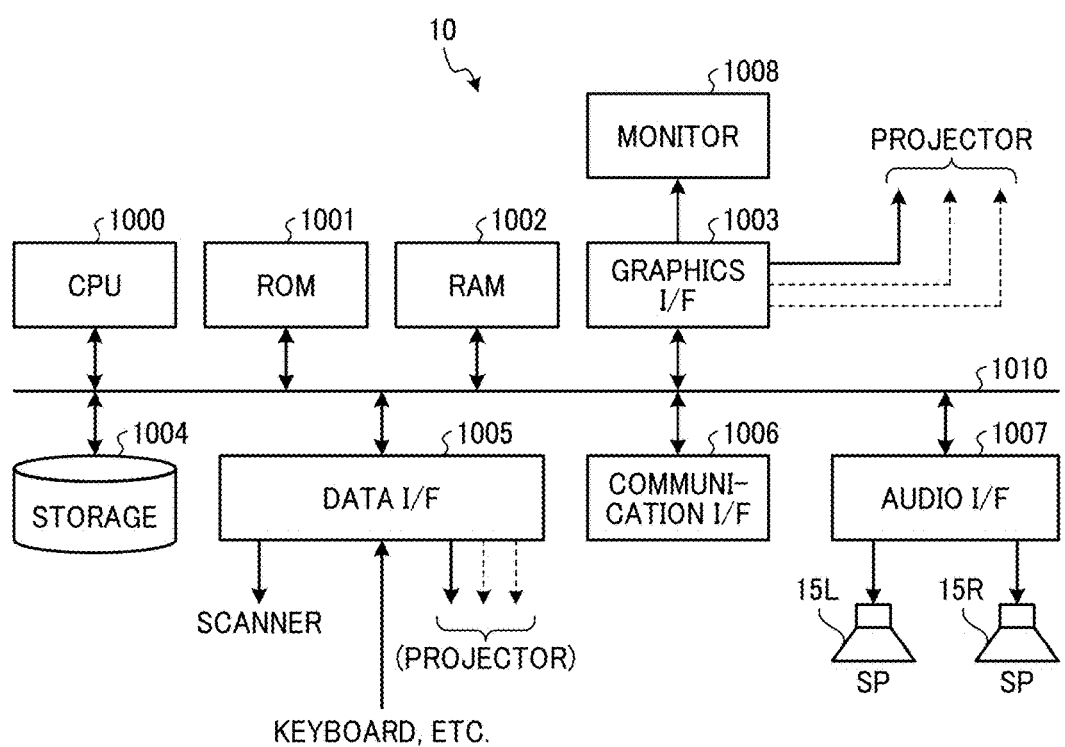
FIG. 5 is a block diagram illustrating an example of a hardware configuration of the display control apparatus, according to the first embodiment of the present disclosure.

Example of Configuration Applicable to First Embodiment:

FIG. 5 is a block diagram illustrating an example of hardware configuration of the display control apparatus 10 applicable to the first embodiment. The display control apparatus 10 of FIG. 5 includes, for example, a central processing unit (CPU) 1000, a read only memory (ROM) 1001, a random access memory (RAM) 1002, and a graphics interface (I/F) 1003, which are connected a bus 1010. The display control apparatus 10 further includes, for example, a storage 1004, a data I/F 1005, a communication I/F 1006 and an audio I/F 1007, which are also connected to the bus 1010. In other words, the same configuration as that of a general-purpose personal computer can be applied to the display control apparatus 10.

The CPU 1000 controls entire operation of the display control apparatus 10 using the RAM 1002 as a work memory according to a program stored in advance in the ROM 1001 and the storage 1004. To the graphics I/F 1003, a monitor 1008 is connected. The graphics I/F 1003 converts display control signals generated by the CPU 1000 into signals that can be displayed on the monitor 1008, and outputs the converted signals to the monitor 1008. Further, the graphics I/F 1003 converts the display control signals into signals that can be displayed by the projector 11 and outputs the converted signals.

The storage 1004 is a non-volatile data storage medium. Examples of the storage 1004 include a hard disc drive. In another example, a nonvolatile semiconductor memory such as a flash memory may be used as the storage 1004. The storage 1004 stores the above-described program to be executed by the CPU 1000 and various data.

The data I/F 1005 controls input and output of data from and to external devices. For example, the data I/F 1005 is used as an interface between the display control apparatus 10 and the scanner 20. Further, signals from a keyboard or a pointing device such as a mouse are input to the data I/F 1005. Further, the display control signals generated by the CPU 1000 may be output from the data I/F 1005 such that each projector 11 is provided with the display control signals, for example. Interfaces such as a universal serial bus (USB) or Bluetooth (registered trademark) can be applied as the data I/F 1005.

The communication I/F 1006 controls communication via a network such as the Internet or a local area network (LAN).

The audio I/F 1007 converts sound data as digital data supplied via the bus 1010 into sound signals as analog signals. In this example, the audio I/F 1007 include an amplifier circuit that amplifies the sound signals to be output from a speaker. Further, the audio I/F 1007 supports a stereo output, and is able to control the localization of the sound signals to be output according to instructions of the CPU 1000. The stereo sound signals on which the localization and the amplification by the audio I/F 1007 have been performed are supplied to the left speaker 15L and the right speaker 15R.

This display control apparatus 10 is also applicable to the display system 1b including the projectors $11_1$, $11_2$ and $11_3$ illustrated in FIG. 2. In this case, the graphics I/F 1003 converts the display control signals into signals that can be displayed by the projectors $11_1$, $11_2$ and $11_3$, and outputs the converted signals. In another example, the display control signals generated by the CPU 1000 may be output from the data I/F 1005 to each of the projectors $11_1$, $11_2$ and $11_3$.

Figure 6:
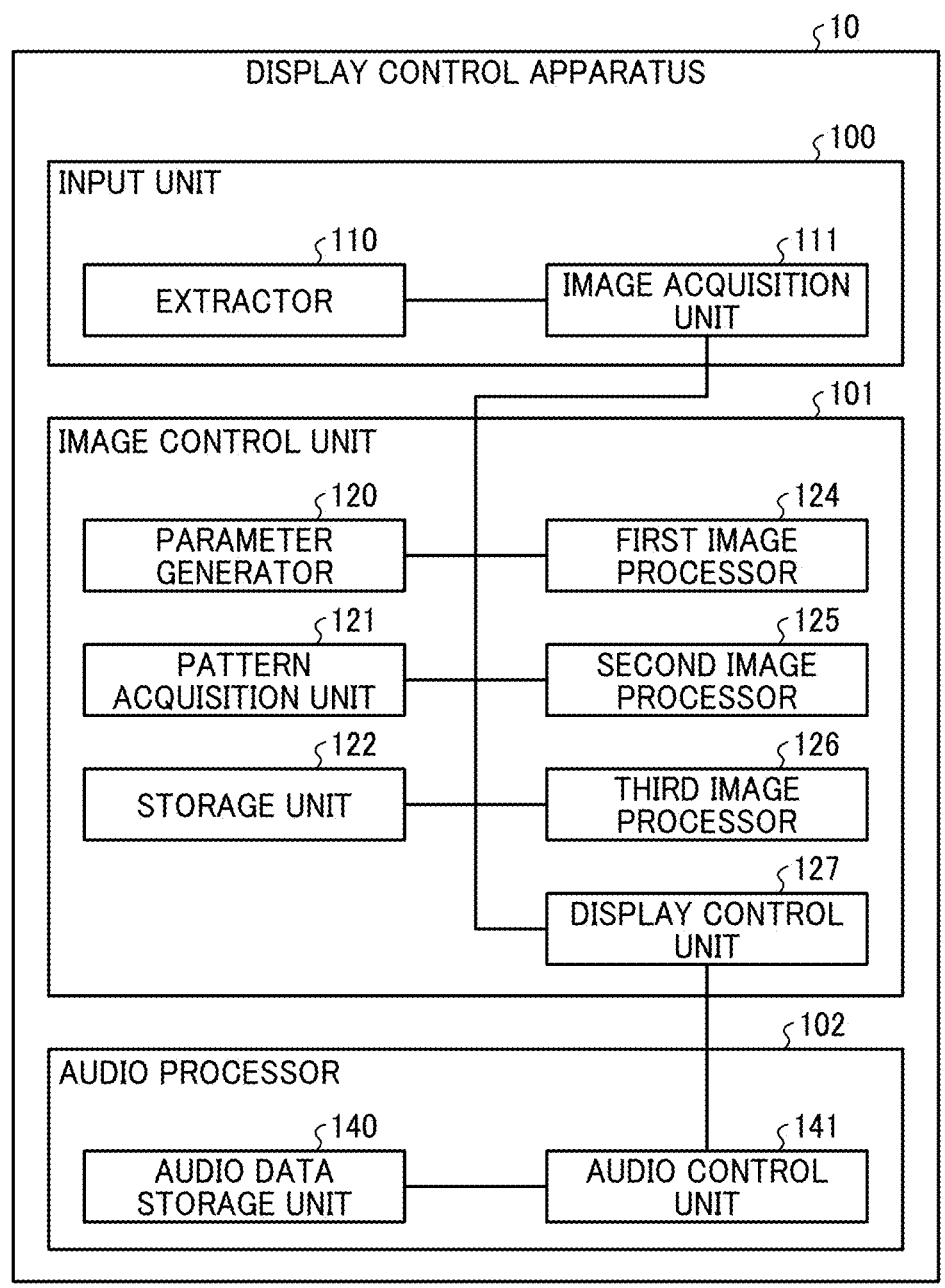
FIG. 6 is a block diagram illustrating an example of a functional configuration of the display control apparatus, according to the first embodiment of the present disclosure.

FIG. 6 is a block diagram illustrating an example of a functional configuration of the display control apparatus 10 according to the first embodiment. In FIG. 6, the display control apparatus 10 includes, for example, an input unit 100, an image control unit 101, and a sound processor 102. The input unit 100 includes, for example, an extractor 110 and an image acquisition unit 111. Further, the image control unit 101 includes, for example, a parameter generator 120, a pattern acquisition unit 121, a storage unit 122, a first image processor 124, a second image processor 125, a third image processor 126, a display control unit 127. The sound processor 102 includes, for example, a sound data storage unit 140 and a sound control unit 141.

Each of the extractor 110, the image acquisition unit 111, the parameter generator 120, the pattern acquisition unit 121, the storage unit 122, the first image processor 124, the second image processor 125, the third image processor 126, the display control unit 127, the sound data storage unit 140 and the sound control unit 141 is implemented by a display control program operating on the CPU 1000. In another example, some of or all of the extractor 110, the image acquisition unit 111, the parameter generator 120, the pattern acquisition unit 121, the storage unit 122, the first image processor 124, the second image processor 125, the third image processor 126, the display control unit 127, the sound data storage unit 140, and the sound control unit 141 may be implemented by hardware circuits operating in cooperation with each other.

The input unit 100 inputs the user image including the picture 22 drawn by hand. More specifically, at the input unit 100, the extractor 110 extracts, from the document image data obtained by scanning the sheet 21 and supplied from the scanner 20, an area containing a drawing drawn by hand, and predetermined information based on an image (e.g., a marker) that is printed in advance on the sheet 21. The image acquisition unit 111 acquires an image of the picture 22 drawn by hand as a user image, from the area extracted by the extractor 110 in the image data supplied from the scanner 20.

The image control unit 101 displays, in the image 13, the first image and the second image, each being based on the user image input to the input unit 100, and the third image stored in advance in the storage 1004, for example.

More specifically, in the image control unit 101, the parameter generator 120 analyzes the user image acquired by the image acquisition unit 111. Further, the parameter generator 120 generates parameters used for controlling display of the first image, the second image and the third image, based on the analysis result of the user image. The storage unit 122 controls storing and reading of image data with respect to the storage 1004, for example.

The first image processor 124 generates the first image, which is a moving image obtained by diffusing one or more pixels from among pixels constituting the user image acquired by the image acquisition unit 111. Based on the user image used when the first image processor 124 generates the first image, the second image processor 125 generates the second image. As described above, the second image is an image based on which a figure pattern of the original image can be recognized and that includes a contour of the original image. The third image processor 126 performs processing relating to the third image, which is a firework image. The display control unit 127 controls display of the first image, the second image and the third image output from the first image processor 124, the second image processor 125, and the third image processor 126.

The sound processor 102 performs processing of reproducing sound effects according to the display control of the first image, the second image, and the third image by the display control unit 127. In the sound processor 102, the sound data storage unit 140 reads out sound data stored in advance in the storage 1004. The sound effects include, for example, a first sound representing ignition to fireworks, a second sound representing fireworks flying up in the sky, and a third sound representing the burst of a fireworks shell. The sound effects may further include back ground music (BGM).

The sound control unit 141 selects sound to be reproduced from the first sound, the second sound and the third sound according to the display control of the first image, the second image and the third image by the display control unit 127, and outputs an audio signal of the selected sound. The sound control unit 141 is able to control localization of the sound to be reproduced in stereo. The audio signal output from the sound control unit 141 is amplified by an amplifier circuit and supplied to the speakers 15L and 15R.

The display control program to implement each function of the display control apparatus 10 according to the first embodiment may be stored in a computer-readable storage medium such as a compact disk (CD), a flexible disk (FD), and a digital versatile disc (DVD), in an installable or executable format, for distribution. In another example, the display control program may be stored in a computer connected to a network such as the Internet and provided by downloading via the network. Further, the information processing program may be provided or distributed via a network such as the Internet.

The display control program has a module configuration including the above-described units such as the extractor 110, the image acquisition unit 111, the parameter generator 120, the pattern acquisition unit 121, the storage unit 122, the first image processor 124, the second image processor 125, the third image processor 126, the display control unit 127, the sound data storage unit 140 and the sound control unit 141. In an actual hardware configuration, the CPU 1000 reads out the display control program from a storage medium such as the storage 1004 and executes the display control program, such that the above-described units are loaded onto a main memory such as RAM 1002, and the extractor 110, the image acquisition unit 111, the parameter generator 120, the pattern acquisition unit 121, the storage unit 122, the first image processor 124, the second image processor 125, the third image processor 126, the display control unit 127, the sound data storage unit 140, the sound control unit 141 are generated on the main memory.

Figure 7:
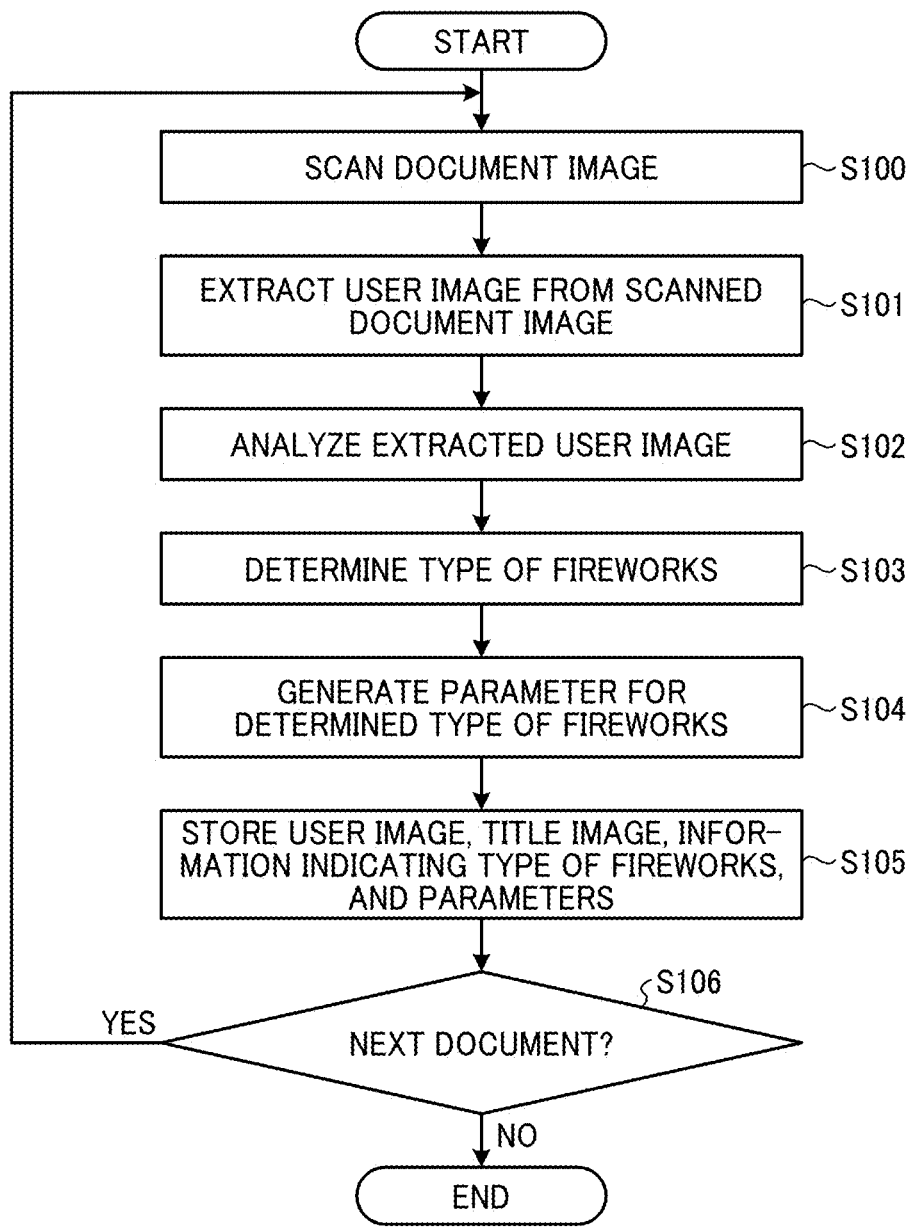
FIG. 7 is a flowchart illustrating an example of an operation of scanning a document image, according to the first embodiment of the present disclosure.

Document Image Scanning Process According to First Embodiment:

FIG. 7 is a flowchart illustrating an example of an operation of scanning a document image according to the first embodiment. Prior to the execution of the processing of this flowchart, a hand-drawn picture by a user is created. In this example, the user draws a picture by hand on the sheet 21 having a predetermined format. Such dedicated sheet used by the user is provided, for example, by a service provider of a service using the display system 1a. The user draws by hand a picture that he/she wants to be displayed together with the third image (firework image) on the sheet 21.

Figure 8:
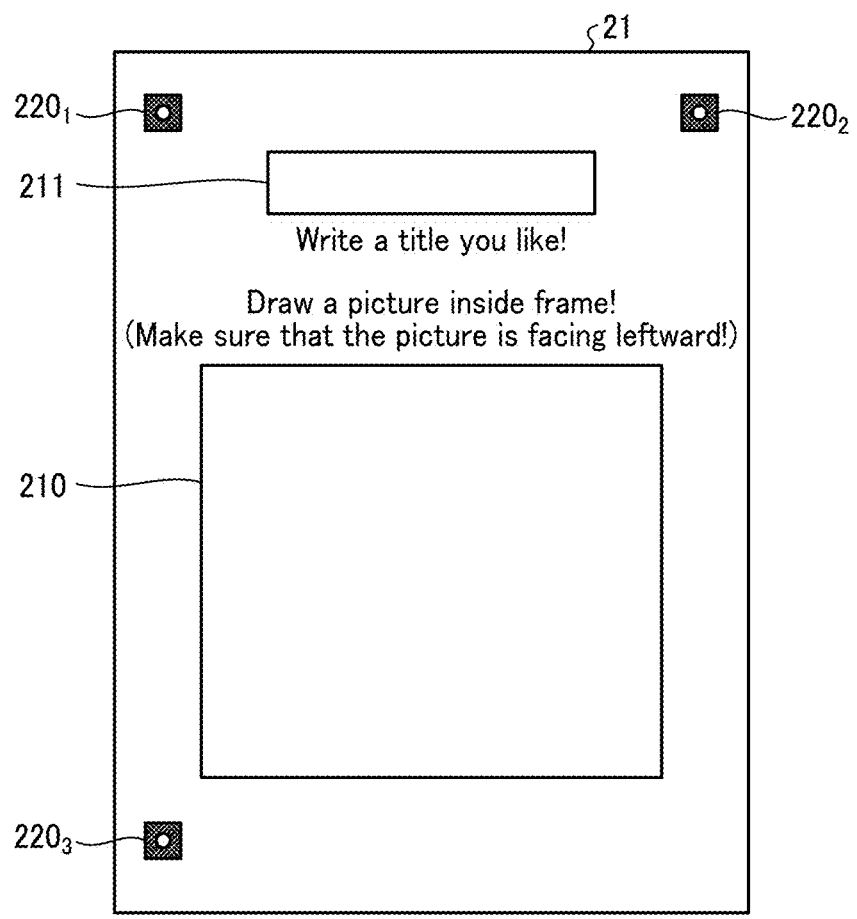
FIG. 8 is a diagram illustrating an example of a sheet on which an image is to be drawn by hand, according to the first embodiment of the present disclosure.

FIG. 8 illustrates an example of the sheet 21 on which the user draws a picture by hand, according to the first embodiment. The sheet 21 illustrated in FIG. 8 includes a title area 211 in which a title is to be entered and a drawing area 210 in which the user draws a picture. FIG. 9 illustrates an example of the sheet 21 of FIG. 8 on which the picture 22 and a title 24 are drawn. As illustrated on the left side of FIG. 9, the picture 22 is drawn in the drawing area 210, and the title 24 is drawn in the title area 211.

Further, markers $220_1$, $220_2$, and $220_3$ are arranged on three corners of the four corners of the sheet 21. The markers $220_1$, $220_2$, and $220_3$ are makers for detecting the orientation and size of the sheet 21 and for detecting the position of the drawing area 210.

In the flowchart of FIG. 7, the scanner 20 scans an image on the sheet 21 including the picture 22 drawn by the user by hand to obtain a document image. The obtained document image is output to the display control apparatus 10 and input to the input unit 100 in step S100.

In the next step S101, at the display control apparatus 10, the extractor 110 at the input unit 100 extracts a user image 2100 from the input document image.

First, the extractor 110 at the input unit 100 detects each of the markers $220_1$, $220_2$, and $220_3$ from the document image using, for example, pattern matching. The extractor 110 determines the orientation and size of the document image based on the position of each of the detected markers $220_1$, $220_2$, and $220_3$ on the document image. The position of the drawing area 210 on the sheet 21 is fixed. Further, information indicating the position of the drawing area 210 on the sheet 21 is stored in advance in the storage 1004. Therefore, when the orientation of the document image is specified based on the markers $220_1$, $220_2$, and $220_3$, and the ratio between the sheet size and the image size is determined, the drawing area 210 included in the document image can be extracted based on the relative positions according to the ratio. Accordingly, the extractor 110 extracts the drawing area 210 from the document image based on the orientation and size of the document image obtained as described above.

The image acquisition unit 111 further extracts a drawing portion drawn by the user from an image of the area surrounded by the drawing area 210, to obtain the user image 2100 constituted as the extracted drawing portion. In other words, the image acquisition unit 111 trims a blank portion where no drawing is made from the image of the area surrounded by the drawing area 210, to acquire the user image 2100. In this case, the image acquisition unit 111 acquires a blank portion inside the extracted drawing portion as a part of the user image 2100. The user may draw any arbitrary image in the drawing area 210.

In another example, the image acquisition unit 111 may obtain, as the user image 2100, the smallest rectangle that includes the extracted drawing portion and whose sides are parallel to the corresponding sides of the drawing area 210. In this case, mask information is added to a blank portion outside the contour of the user image 2100 included in the rectangle.

Further, the image acquisition unit 111 acquires an image in the title area 211 as a title image 2110 based on information indicating a position of the title area 211 on the sheet 21, the information being stored in advance in the storage 1004. Examples of the user image 2100 extracted from the drawing area 210 in the document image and the title image 2110 extracted from the title area 211 are illustrated on the right side of FIG. 9.

The input unit 100 outputs the user image 2100 and the title image 2110 acquired by the image acquisition unit 111 to the image control unit 101.

In the next step S102, the parameter generator 120 at the image control unit 101 analyzes the user image 2100 extracted in step S101. In the next step S103, based on the analysis result of the user image 2100, the parameter generator 120 at the image control unit 101 determines a type of fireworks to be used as the third image (firework image) from a plurality of types of fireworks, each having a different scattering pattern of light spots.

Figure 10A:
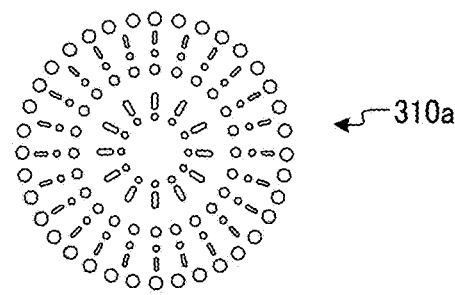
FIGS. 10A to 10E each illustrate an example of a types of fireworks, according to the first embodiment of the present disclosure.
Figure 10B:
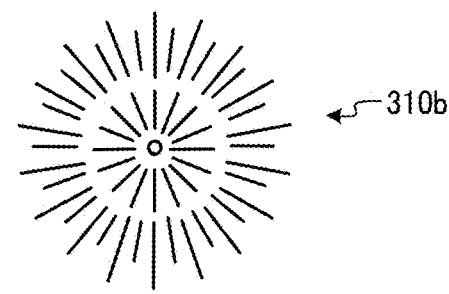
Figure 10C:
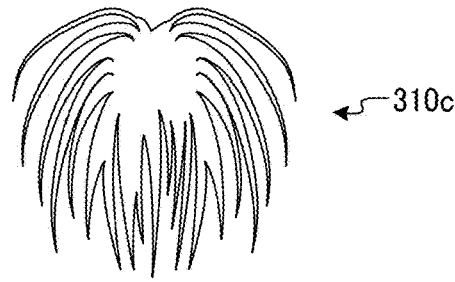
Figure 10D:
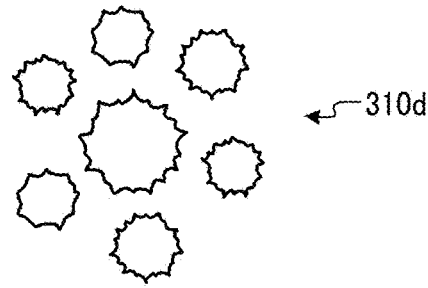
Figure 10E:
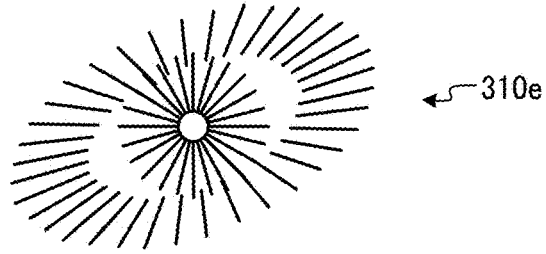

FIGS. 10A to 10E illustrate examples of the types of fireworks, according to the first embodiment. FIG. 10A illustrates an example of a firework image 310a of one of the types of fireworks called "chrysanthemum". FIG. 10B illustrates an example of a firework image 310b of one of the types of fireworks called "peony". FIG. 10C illustrates an example of a firework image 310c of one of the types of fireworks called "willow". FIG. 10D illustrates an example of a firework image 310d of one of the types of fireworks called "multi-break shells". FIG. 10E illustrates an example of a firework image 310e of one of the types of fireworks called "Saturn". In addition to these types of fireworks, any other types of fireworks can be applied to the first embodiment. Further, although these types of fireworks fall into a category of aerial fireworks, set fireworks such as "waterfall" may be included in the types of fireworks.

Although the firework images 310a to 310e of FIGS. 10A to 10E each illustrates a typical shape of fireworks of the corresponding type, in fact, each of the fireworks image 310a to 310e includes a moving image expressing by animation how the shell of fireworks bursts, and sparks are scattered and disappear.

The parameter generator 120 analyzes the user image to obtain a feature value of the user image 2100, such as a color distribution or an edge distribution of the user image 2100, or the dimension or centroid of the drawing portion. The parameter generator 120 determines a type of fireworks corresponding to the user image 2100 from among the plurality of firework types by using one or more items of the feature value obtained by analyzing the user image 2100.

The parameter generator 120 may use any other suitable information obtained by analyzing the user image 2100 as the feature value for determining the type of fireworks. In another example, the parameter generator 120 may also analyze the title image 2110, and determines the type of fireworks using the analysis result of the title image 2110. In still another example, the parameter generator 120 may determine the type of fireworks using the feature value of the entire document image. In still another example, the parameter generator 120 may randomly determine the type of fireworks to be used without using the feature value of any one of the user image 2100, the title image 2110 and the document image.

In other words, the user does not know which type of fireworks is to be displayed until the firework image is actually displayed on the image 13. This brings about an effect to entertain the user. If the type of fireworks to be used is randomly determined, it depends on luck whether the firework image of the user's desired type is displayed. By contrast, if the information acquired from the document image have an influence on the determination of the type of fireworks to be used, it means that the determination is made according to some patterns that the user can manipulate who draws the picture 22 on the sheet 21. The simpler the information acquired from the document image to be used for the determination, the easier for the user to discover in which pattern the determination is made. This motivates the user to draw the picture 22 based on which the firework image of the user's desired type is displayed. The parameters to be used for determining the type of fireworks are selected depending on how randomly the determination is to be made.

In still another example, information such as a marker for designating a firework type used for displaying a firework image from the plurality of firework images 310*a* to 310*e* may be printed in advance on the sheet 21, for example. In this case, the extractor 110 at the input unit 100 extracts this information from the document image obtained by scanning an image on the sheet 21, and determines the type of fireworks to be used from among the firework images 310*a* to 310*e* based on the extracted information.

In the next step S104, based on one or more items of the feature value obtained by analyzing the user image 2100 in step S102, the parameter generator 120 generates parameters relating to the display of the firework image corresponding to the type determined in step S103. In addition, the parameter generator 120 generates parameters relating to the display of the user image based on the one or more items of the feature value.

In the next step S105, the storage unit 122 at the image control unit 101 stores, in the storage 1004, data items including the user image 2100, the analysis result of the user image 2100, and the parameters determined and generated by the parameter generator 120. Further, the storage unit 122 at the image control unit 101 stores the title image 2110 in the storage 1004.

In the next step S106, the input unit 100 determines whether scanning of another document is to be performed. When the input unit 100 determines that the scanning of another original is to be performed (S106: YES), the operation returns to step S100. By contrast, when the input unit 100 determines that the scanning of another original is not to be performed (S106: NO), the operation of the flowchart of FIG. 7 ends. For example, the input unit 100 determines whether the scanning of another document is to be performed based on a user operation to the display control apparatus 10.

Figure 11:
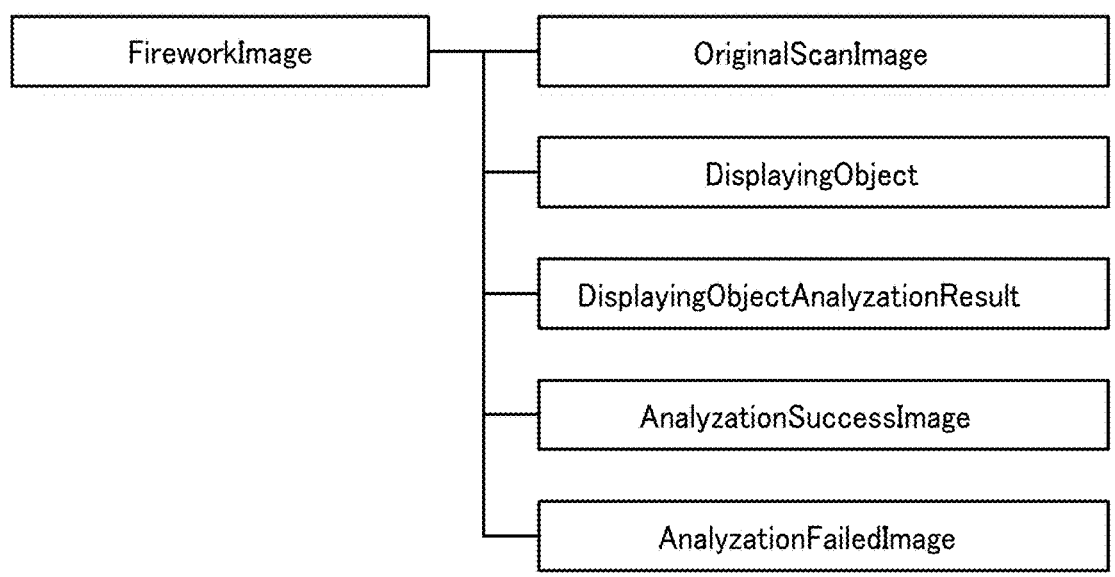
FIG. 11 is a diagram illustrating an example of a folder structure, according to the first embodiment of the present disclosure.

FIG. 11 illustrates an example of a folder structure in the storage 1004 in which each data is stored in the above-described step S105 by the storage unit 122, according to the first embodiment. In the example of FIG. 11, five folders named "OriginalScanImage", "DisplayingObject", "DisplayingObjectAnalyzationResult", "AnalyzationSuccessImage", and "AnalyzationFailedImage" are provided under a folder named "FireworkImage" Data items stored in those folders may be associated with each other for each document image (user image), based on a file name of a file in which each data is stored.

In the folder "OriginalScanImage", one or more items of the document image data that are input to the input unit 100 in step S100 are stored. In the folder "DisplayingObject", the user image data is stored, which is a source of the first image and the second image that are currently displayed as a part of the image 13. An upper limit is placed on the number of user images, each being a source of the first image and the second image that are displayed as a part of the image 13. Accordingly, in the folder "DisplayingObject", plural items of the user image data up to this upper limit can be stored. For example, when the number of user images extracted in step S101 exceeds this upper limit, the storage unit 122 deletes the oldest one of the user images stored in the folder "DisplayingObject" and stores the newly extracted user image in this folder. In addition, the storage unit 122 can set a specific user image among the user images stored in the folder "DisplayingObject" not to be deleted.

In the folder "DisplayingObjectAnalyzationResult", the analysis results of the user images corresponding to the user images stored in the folder "DisplayingObject" are stored. For example, in the folder "DisplayingObjectAnalyzationResult", the parameters extracted based on each of the user images stored in the folder "DisplayingObject" are stored.

In the folder "AnalyzationSuccessImage", one or more successful analysis results are stored from among the analysis results obtained by analyzing the user image data items, each being extracted from the document image data stored in the folder "OriginalScanImage". For example, in the case where the specific user image that is deleted from the folder "DisplayingObject" is to be displayed again, the document image corresponding to the specific user image is read out from the folder "OriginalScanImage" to extract the user image therefrom, and the analysis result that corresponds to the document image and is stored in the folder "AnalyzationSuccessImage" is applied to the extracted user image.

In the folder "AnalyzationFailedImage", one or more failed analysis results are stored from among the analysis results obtained by analyzing the user image data items, each being extracted from the document image data stored in the folder "OriginalScanImage". For example, the data stored in this folder "AnalyzationFailedImage" is used when adjusting the operations of the image acquisition unit 111 and the parameter generator 120.

(Display Control Process According to First Embodiment)

Hereinafter, a description is given of a display control process according to the first embodiment. As described above, in the first embodiment, the first image and the second image are generated using the user image. The first image is a moving image obtained by diffusing one or more pixels from among pixels constituting the user image, for example. The second image is an image based on the user image, based on which a figure pattern of the user image is identifiable and that includes a contour of the user image. The first image is superimposed on the generated second image to obtain a combined image. Further, the third image, which is implemented by the firework image as a moving image, is superimposed on the combined image.

Figure 12:
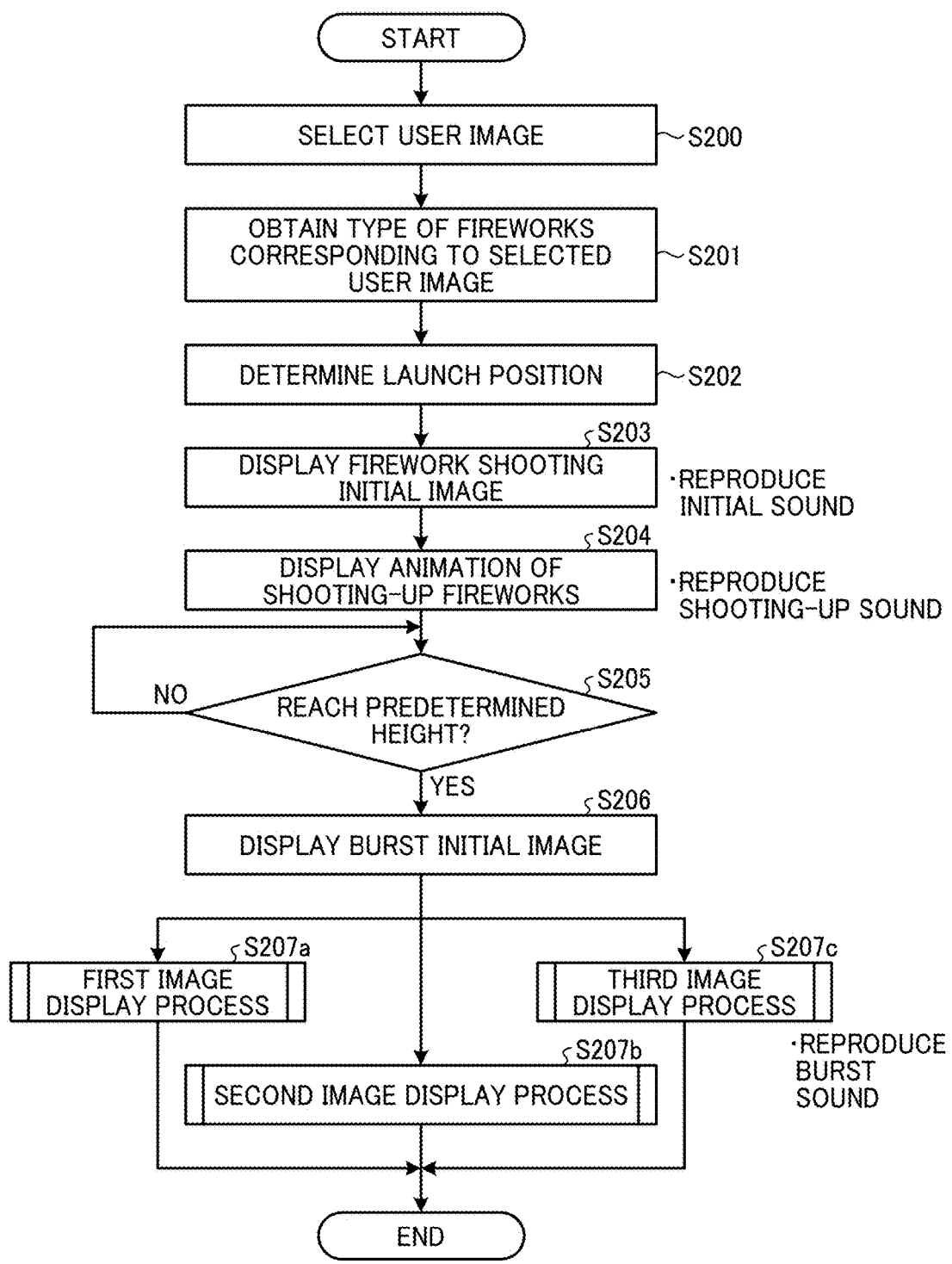
FIG. 12 is a flowchart illustrating an example of an operation of controlling display of an animation simulating a shooting of fireworks, according to the first embodiment of the present disclosure.

First, a description is given of an overall display control process according to the first embodiment, with reference to a flowchart of FIG. 12 and display examples of FIGS. 13A to 13H. FIG. 12 is a flowchart illustrating an example of an operation of controlling display of an animation simulating the shooting of fireworks, according to the first embodiment.

The animation simulating the shooting of fireworks includes animation simulating how a shell of fireworks is launched, bursts, and sparks are scattered and disappear. In the following description, unless otherwise noted, the "animation simulating the shooting of fireworks" is referred to as a "fireworks shooting-up animation" or "shooting-up animation" in order to simplify the description.

In FIG. 12, in step S200, the display control unit 127 selects a user image to be used for representation of the burst of the fireworks shell in the shooting-up animation. For example, the display control unit 127 selects, as the user image used for the display, the user image extracted from the document image by the operation of the flowchart illustrated in FIG. 7. In another example, the display control unit 127 may control the storage unit 122 to read out one user image from a predetermined folder (e.g., the folder "DisplayingObject") in the storage 1004, to select the user image that is read out as a user image to be used for the display.

In the next step S201, the display control unit 127 acquires the type of fireworks corresponding to the user image selected in step S200. For example, the display control unit 127 acquires the type of fireworks that is determined based on the selected user image by the process of step S103 in the flowchart of FIG. 7 described above. In another example, the display control unit 127 may obtain the type of fireworks based on the analysis result that corresponds to the selected user image and is stored in the folder "DisplayingObjectAnalyzationResult".

In the next step S202, the display control unit 127 determines a launch position in the image 13. For example, the display control unit 127 determines a center portion in a horizontal direction of the image 13 in the vicinity of a bottom of the image 13 as the launch position. For example, the position in the horizontal direction is cyclically selected each time the process of displaying the shooting-up animation is performed from a plurality of positions that are set in advance in the center portion in a horizontal direction of the image 13. Also, a height H of the determined launch position is set to 0.

Figure 13A:
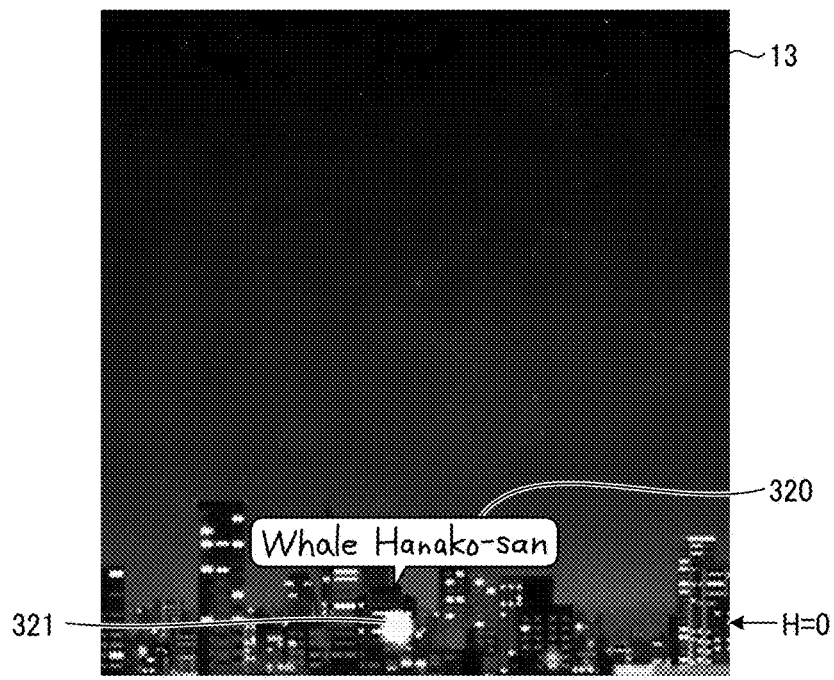
FIGS. 13A to 13H are diagrams, each illustrating an example of an image displayed by display control processing, according to the first embodiment of the present disclosure.

In the next step S203, the display control unit 127 controls a firework shooting start image 321 representing a start of fireworks shooting to be displayed at the determined launch position. FIG. 13A illustrates an example of the image 13 including the firework shooting start image 321. In this example, the firework shooting start image 321 is an image that represents a start of fireworks shooting using a set of light spots. In the case where the title image 2110 is drawn in the title area 211 of the sheet 21 on which the picture 22 as an original of the user image selected in step S200 is drawn, an image 320 based on the title image 2110 is displayed in the vicinity of the firework shooting start image 321.

The display control unit 127 may give an animation effect to the firework shooting start image 321, such as swinging up and down or right and left, or repeating enlargement and reduction at regular intervals. This makes it easy for a user (viewer) to recognize that the shooting-up animation is started.

Further, at the sound processor 102, the sound control unit 141 reproduces a starting sound according to the timing when the firework shooting start image 321 is displayed by the display control unit 127. Examples of the starting sound includes a click sound to express ignition.

Figure 13B:
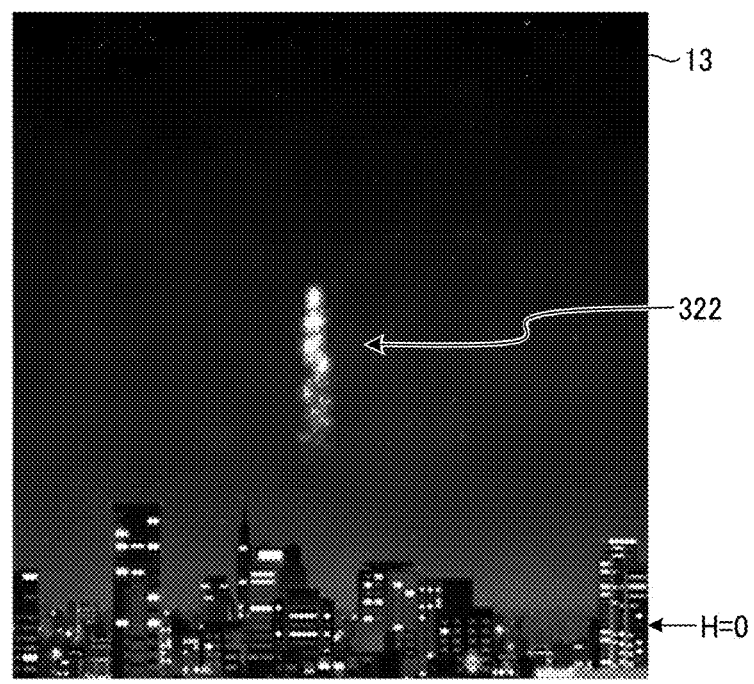

The display control unit 127 controls the display of the firework shooting start image 321 in the step 203 to continue for a predetermined time (e.g., several seconds), and then the operation proceeds to step S204. In step S204, the display control unit 127 displays a firework shooting-up image 322 representing a firework that is shot up in the sky using animation. FIG. 13B illustrates an example of the image 13 including the firework shooting-up image 322. In this case, the firework shooting-up image 322 is implemented by an animation representing a set of light spots rising vertically from a position where the firework shooting start image 321 in the image 13.

The display control unit 127 may set a flying speed (a speed at which the launched fireworks fly up to reach a predetermined height h described later) according to an aspect ratio of the user image, based on the analysis result of the user image.

In addition, at the sound processor 102, the sound control unit 141 reproduces a sound expressing fireworks that fly up, while the firework shooting-up image 322 is being displayed by the display control unit 127.

Next, in step S205, the display control unit 127 determines whether a head portion of the firework shooting-up image 322, reaches the predetermined height h in the image 13. The head portion of the firework shooting-up image 322 corresponds to a highest portion of the firework shooting-up image 322 displayed in the image 13. When the display control unit 127 determines that the head portion does not reach the predetermined height h (S205: NO), the operation returns to step S205.

Figure 13C:
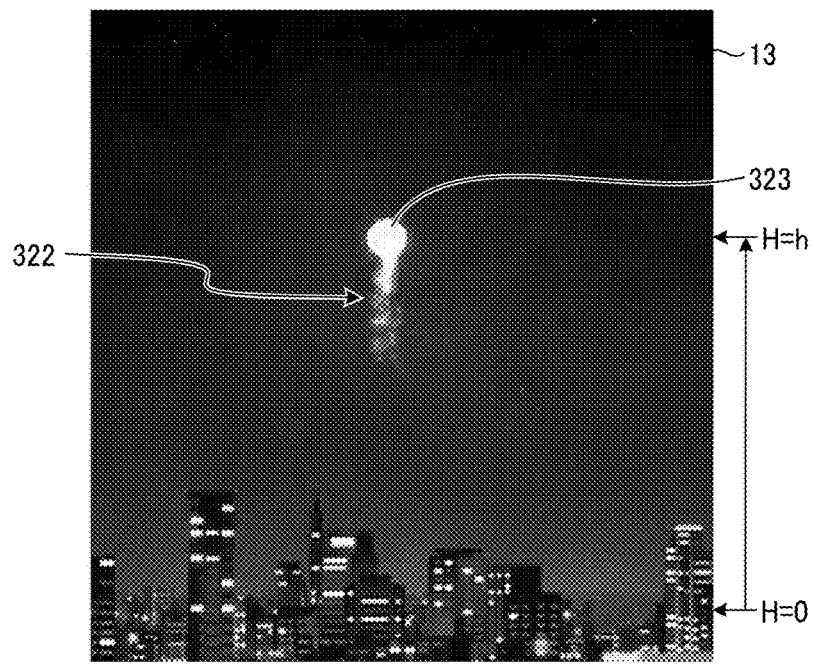

By contrast, when the display control unit 127 determines that the head portion of the firework shooting-up image 322 reaches the predetermined height h (S205: YES), the operation proceeds to S206. In step S206, as illustrated in FIG. 13C, the display control unit 127 displays a burst start image 323 expressing how a shell of fireworks bursts at the height h in the image 13.

After displaying the burst start image 323 in step S206, the display control unit 127 performs a first image display process relating to the generation of the first image in step S207a, a second image display process relating to the generation of the second image in step S207b, and a third image display process relating to the generation of the third image in step S207c.

As described in detail later, the display control unit 127 generates the image 13 to be projected onto the screen 12, by combining an animation simulating a scene after a shell of fireworks bursts with a predetermined background image. This animation is implemented by a composite image obtained by combining the first image, the second image, and the third image generated in steps S207a, S207b, and S207c. FIGS. 13D to 13H each illustrates an example of the image 13 in which animation obtained based on the first image, the second image and the third image is displayed. A detailed description is given later of these examples of the image 13.

Figure 14:
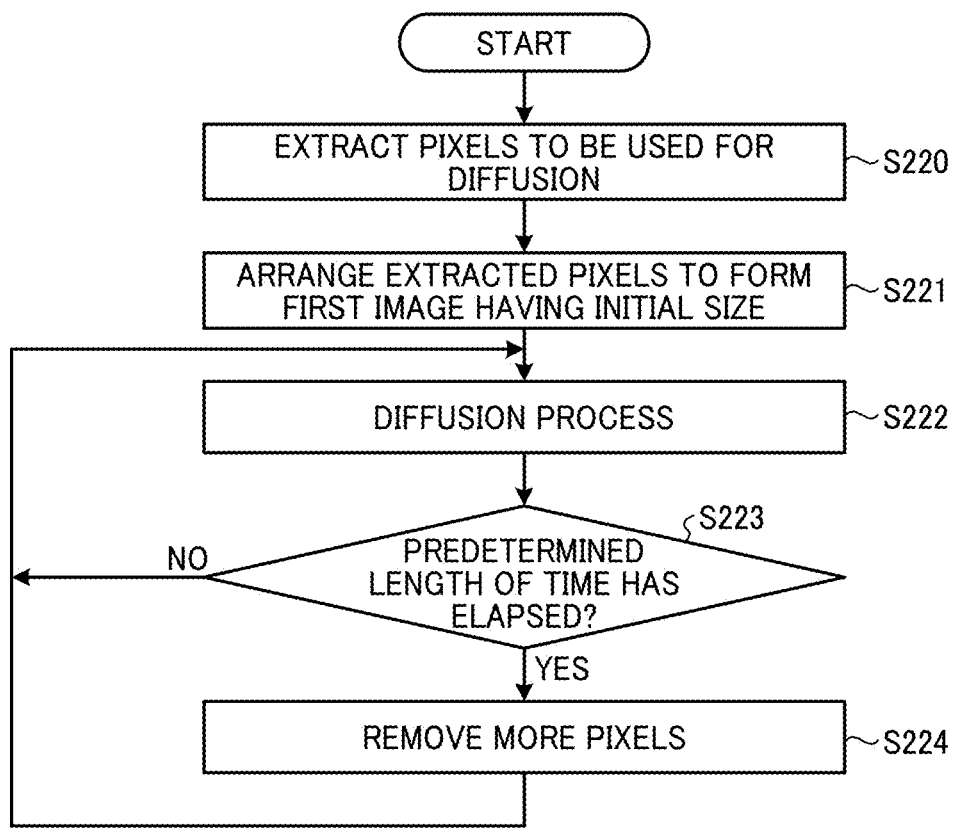
FIG. 14 is a flowchart illustrating of an example of an operation of generating a first image, according to the first embodiment of the present disclosure.

FIG. 14 is a flowchart illustrating of an example of an operation of generating the first image performed in step S207a, according to the first embodiment. As described above, the first image is an animation image obtained by diffusing one or more pixels from among pixels constituting the user image as a processing target. In step S220, the first image processor 124 extracts pixels used for diffusion from the user image. For example, the first image processor 124 thins out pixels constituting the user image at a constant pitch, and extracts the remaining pixels as the pixels used for diffusion. Each of the extracted pixels has position information indicating its original position in the user image.

In the next step S221, the first image processor 124 rearranges the pixels extracted in step S220, such that a shape formed by the rearranged pixels is reduced to an initial size of the first image. More specifically, the first image processor 124 rearranges the extracted pixels to form an image having the same shape as the original user image, but smaller than the original user image. Further, for example, the first image processor 124 acquires the position of centroid of the user image. Based on the acquired position of centroid, the first image processor 124 rearranges the extracted pixels such that the centroid of an image formed by the rearranged pixels matches the centroid of the original user image. For example, the initial size of the first image is the same as that of the burst start image 323 illustrated in FIG. 13C.

In the next step S222, the first image processor 124 moves the positions of pixels rearranged in step S221 to perform a pixel diffusion process. For example, the first image processor 124 sets a moving direction for each of the pixels such that each pixel moves in a direction from the centroid toward outside. Each pixel moves in the set moving direction, and thus the pixel diffusion process is implemented. The first image processor 124 may randomly set a moving speed of each pixel within a predetermined range. In addition, the first image processor 124 may add a coefficient acquired based on the analysis result of the target user image to the movement speed of each pixel. Alternatively, the first image processor 124 may multiply the movement speed of each pixel by the coefficient acquired based on the analysis result of the target user image.

In the next step S223, the first image processor 124 determines whether a predetermined time has elapsed since the process of step S222. The predetermined time may be about several frames or ten-odd frames of moving image display, for example. When the first image processor 124 determines that the predetermined time has not elapsed (S223: NO), the operation returns to step S222.

By contrast, when the first image processor 124 determines that the predetermined time has elapsed since the process of step S222 (S223: YES), the operation proceeds to step S224. In step S224, the first image processor 124 further thins out the pixels of the image that is being diffused. Then, the operation returns to step S222. The pitch of thinning at this step may be determined based on, for example, the analysis result of the target user image. By repeating the processes of steps S222 to S224, the first image processor 124 is able to express how the user image diffuses in units of pixels and gradually disappears.

Although a description is given heretofore of an example in which the diffusion is performed for each pixel, any other suitable diffusion process may be performed. In another example, pixels having the same pixel value as the pixels extracted in step S220 may be generated. In this case, the diffusion process of step S222 and the subsequent steps may be performed using a set of the extracted pixel and the generated pixel adjacent to the extracted pixel. Further, the above-described diffusion process is just an example, and the present embodiment is not limited to this example.

Figure 15:
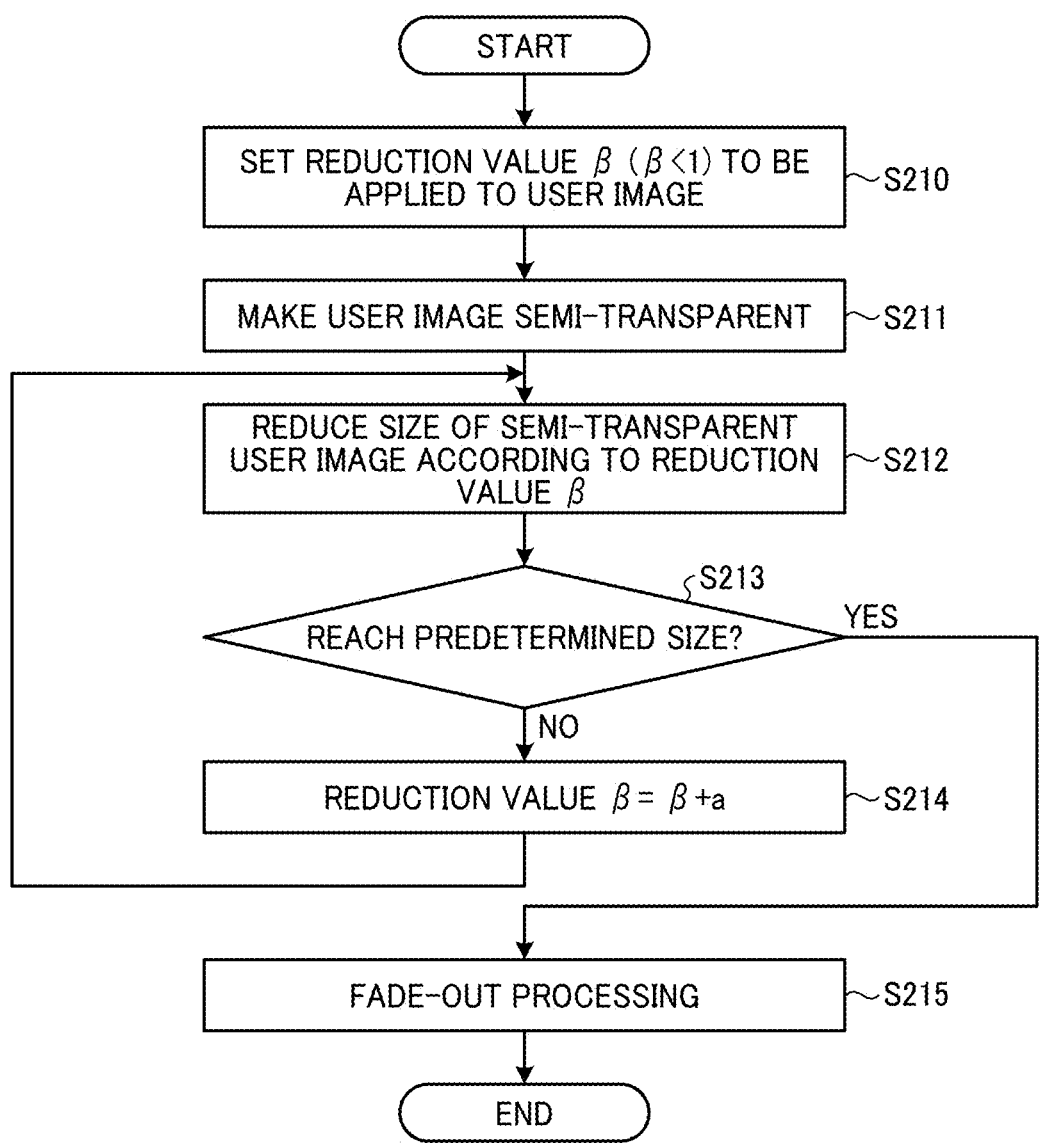
FIG. 15 is a flowchart illustrating of an example of an operation of generating a second image, according to the first embodiment of the present disclosure.

FIG. 15 is a flowchart illustrating of an example of an operation of generating the second image performed in step S207b, according to the first embodiment. As described above, the second image is generated based on the user image as a processing target, and is an image based on which a figure pattern of the user image can be identified and that includes a contour of the user image.

In this example, a semitransparent image is generated by setting a predetermined transmittance to the user image as the second image, based on which the figure pattern of the user image can be identified and that includes the contour of the user image. The transmittance is set to a value such that a background image arranged behind the user image can be recognized through the user image, such as 40% to 60%. This semitransparent image is generated by using a known alpha blending technique, for example.

In FIG. 15, in step S210, the second image processor 125 sets an initial reduction value $\beta$ to be applied to the user image. In this example, the initial reduction value $\beta$ is $0<\beta<1$. The reduction value $\beta$ is, for example, a coefficient of multiplication with respect to the size of the original image. The smaller the reduction value, the smaller the size is reduced. For example, in step S210, the reduction value $\beta$ is set to a value that reduces the user image to approximately the same size as the burst start image 323 illustrated in FIG. 13C.

In the next step S211, the second image processor 125 performs semi-transparency processing on the target user image using, for example, the above-described alpha blending. For example, the second image processor 125 adds a coefficient $\alpha$ specifying the transmittance of alpha blending to each of the pixels constituting the user image.

In the next step S212, the second image processor 125 reduces the semitransparent user image, which is obtained by the transparency processing of S211, by the reduction value $\beta$. In the next step S213, the second image processor 125 determines whether the size of the semitransparent user image reduced in step S212 reaches a predetermined size. The predetermined size may be, for example, a size exceeding the size of the original user image. When the second image processor 125 determines that the size of the semitransparent user image does not reach the predetermined size (S213: YES), the operation proceeds to step S214.

In step S214, the second image processor 125 adds, for example, a constant a to the reduction value $\beta$ to generate a new reduction value $\beta$. For example, in the case where the initial reduction value $\beta=0.1$, the constant a is set to about 0.4. After the process of step S214, the operation returns to the process to step S212, where the second image processor 125 generates the semitransparent user image whose size is reduced from the original user image with the new reduction value $\beta$.

The second image processor 125 periodically repeats the processes of steps S212 to S214, every several frames or ten-odd frames of moving image, for example. The cycle of this repetition is not necessarily the same as the predetermined time in step S223 of the flowchart of FIG. 14 described above.

When the second image processor 125 determines that the size of semitransparent user image reduced in step S212 reaches the predetermined size (e.g., a size exceeding the original user image) (S213: YES), the operation proceeds to S215. In other words, when it is assumed that initial reduction value $\beta$ is set to 0.1 and the constant a to be added in the above-described step S214 is set to 0.4, by performing the processes from step S212 to step S214 three times, the reduction value $\beta$ becomes 1.3, which is larger than 1. In the case where the reduction process is a process of multiplying the size of the target image by the reduction value $\beta$, the reduction process by the reduction value $\beta$ that is larger than 1 result in enlargement of the target image.

In another example, the number of repetitions of the processes of step S212 to step S214 may be determined in advance. In this case, the process of step S213 is omitted.

In step S215, the second image processor 125 performs a fade-out processing on the semitransparent user image. For example, the second image processor 125 raises the transparency of the semitransparent user image up to 100% in a period of several frames, to implement the fade-out processing.

Figure 16:
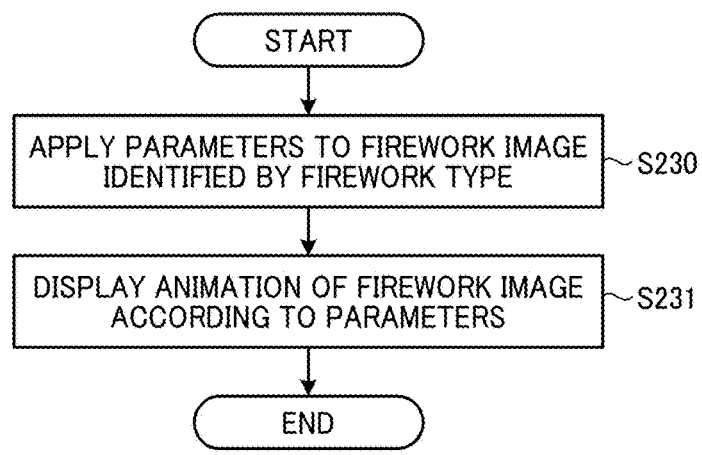
FIG. 16 is a flowchart illustrating of an example of an operation of generating a third image, according to the first embodiment of the present disclosure.

FIG. 16 is a flowchart illustrating of an example of an operation of generating the third image performed in step S207c, according to the first embodiment. As described above, the third image is the firework image corresponding to a type of fireworks determined based on the analysis result of the user image. As illustrated in the flowchart of FIG. 16, in step S230, the third image processor 126 applies the parameters determined based on the analysis result of the user image to the firework image corresponding the type of fireworks determined based on the analysis result of the user image.

For example, the third image processor 126 determines the appearance of the firework image (number of used colors, color type, etc.) according to an average value of color saturation of the pixels of the user image, based on the analysis result of the user image. Further, the third image processor 126 also determines a size of the firework image, the height h at which the burst start image 323 is to be displayed, and a volume of each of the starting sound, a firework shooting sound and a burst sound according to the size of the user image, based on the analysis result of the user image. Furthermore, the third image processor 126 determines the diffusivity of the firework image according to an edge amount included in the user image, based on the analysis result of the user image.

In the next step S231, the third image processor 126 starts displaying an animation of the firework image according to the parameters set in step S230. This animation includes, for example, a scene expressing how the shell of fireworks bursts and how sparks are scattered and disappear in a form corresponding to the type of fireworks. A sequence of animation is specified in advance according to the types of fireworks illustrated as typical firework images 310a to 310e in FIGS. 10A to 10E.

Figure 17:
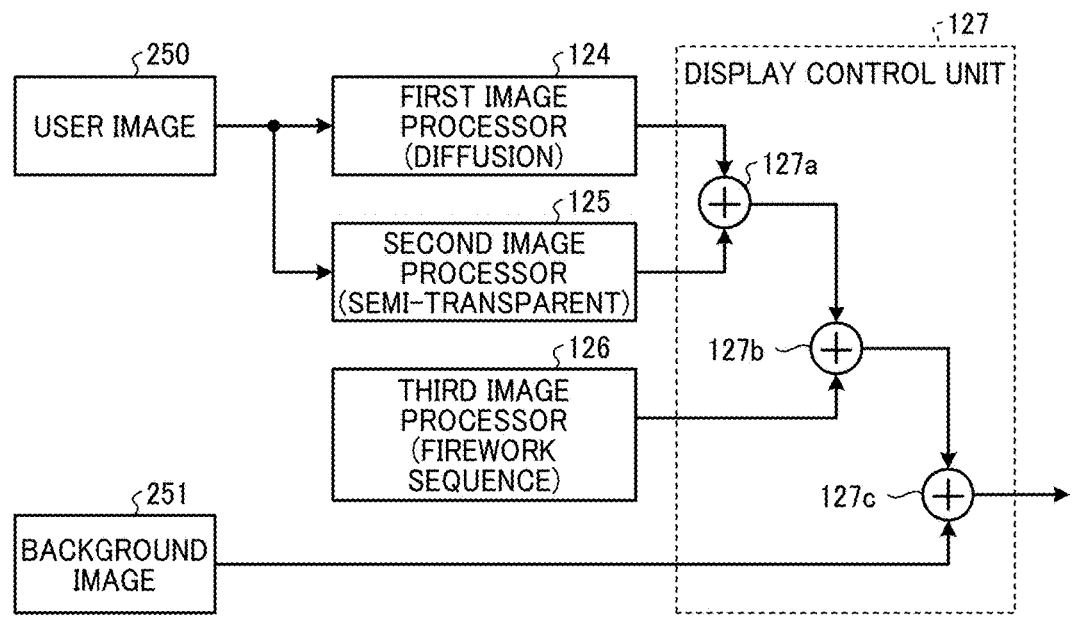
FIG. 17 is a block diagram illustrating an example configuration for combining the first image, the second image and the third image with the background image, according to the first embodiment of the present disclosure.

FIG. 17 is a schematic diagram illustrating an example configuration for combining the first image, the second image and the third image generated according to the flowcharts of FIGS. 14 to 16 described above with the background image. In FIG. 17, the same reference numbers are allocated to elements having the same function as those of FIG. 6, and redundant descriptions thereof are omitted below.

In FIG. 17, the display control unit 127 includes, for example, a first combining unit 127a, a second combining unit 127b, and a third combining unit 127c, each performing an operation or implementing a function of superimposing an image on another image to combine the images with each other. A user image 250 is input to the first image processor 124 that diffuses the user image in units of pixels and the second image processor 125 that performs the semi-transparency processing on the user image.

Figure 18:
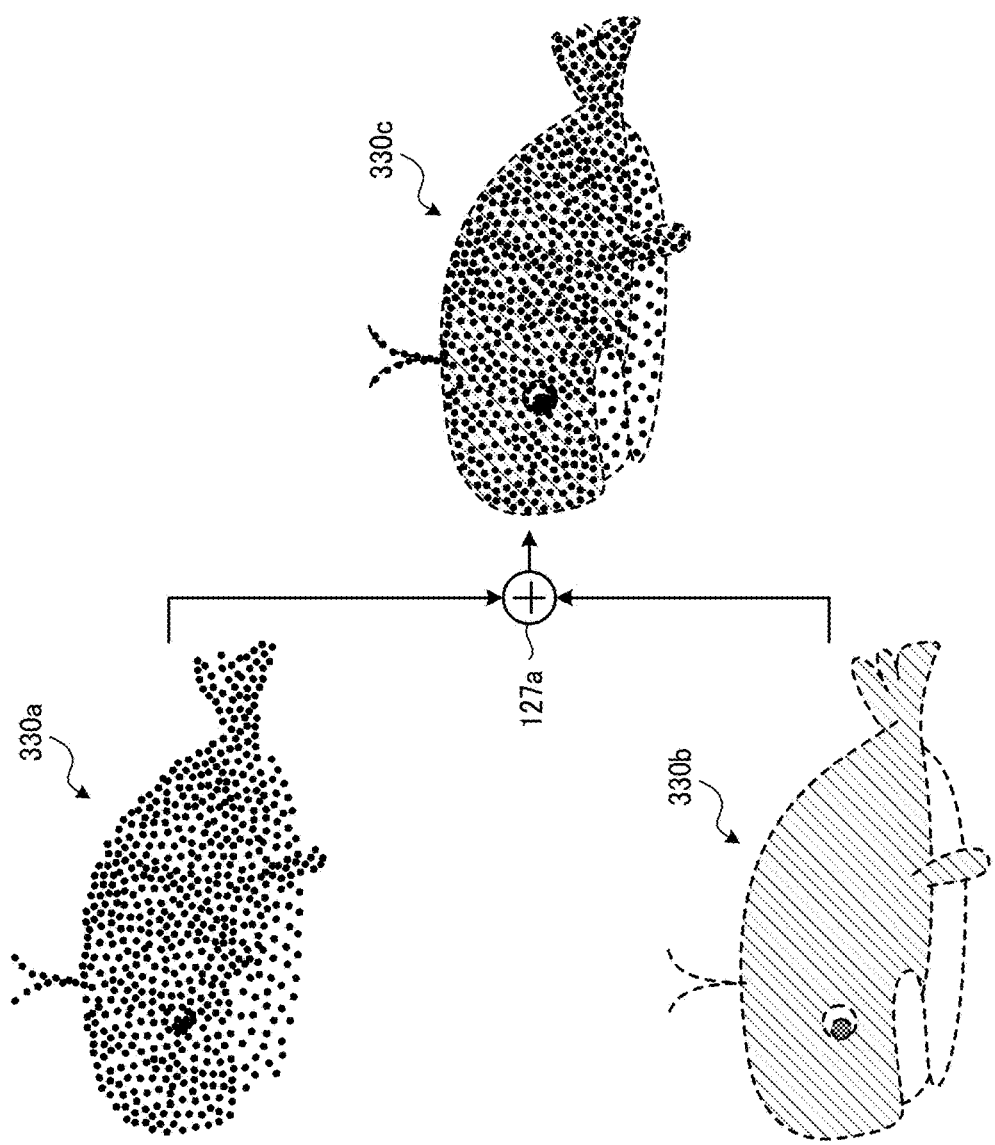
FIG. 18 is an illustration for describing a process of superimposing a diffusion image on a semitransparent user image, according to the first embodiment of the present disclosure.

As illustrated in FIG. 18, the diffusion image 330a obtained by performing the diffusion processing on the user image 250 at the first image processor 124 is input to a first input terminal of the first combining unit 127a. A semitransparent user image 330b obtained by performing the semi-transparency processing on the user image 250 at the second image processor 125 is input to a second input terminal of the first combining unit 127a. The first combining unit 127a superimposes the diffusion image 330a input to the first input terminal on the semitransparent user image 330b input to the second input terminal to output a combined image 330c. Thus, the combined image 330c is an image obtained by superimposing the diffusion image 330a on the front side of the semitransparant user image 330b. From among the pixels constituting the semitransparent user image 330b, one or more pixels, each being arranged in a position where a pixel of the diffusion image 330a is superimposed, are invisible being hidden by the pixel of the diffusion image 330a.

The combined image 330c obtained at the first combining unit 127a by superimposing the diffusion image 330a on the semitransparent user image 330b is input to a second input terminal of the second combining unit 127b. The firework image output from the third image processor 126 is input to a first input terminal of the second combining unit 127b. The second combining unit 127b superimposes the firework image input to the first input terminal on the combined image 330c input to the second input terminal to generate a composite image. The composite image output from the second combining unit 127b is input to a first input terminal of the third combining unit 127c. A background image 251 that is specified in advance is input to a second input terminal of the third combining unit 127c. The third combining unit 127c superimposes the composite image input to the first input terminal on the background image 251 input to the second input terminal.

Thus, with the background image 251 being the rearmost plane, a composite image obtained by layering the background image 251, the semitransparent user image 330b, the diffusion image 330a, and the firework image from back to front in this order is projected on the screen 12 as the image 13.

The display control unit 127 may add an effect to the composite image output from the second combining unit 127b. In one example, the display control unit 127 may rotate the composite image at a predetermined angular velocity. For example, the display control unit 127 rotates the composite image with the centroid of the composite image as the rotation center, on the x-y plane in the image data space 30. In another example, the display control unit 127 may also rotate the composite image such that the z-axis direction of the image data space 30 is further included in the rotation. For example, the display control unit 127 rotates the composite image on the y-z plane with the x-axis passing through the centroid of the composite image as a rotation axis.

Figure 13D:
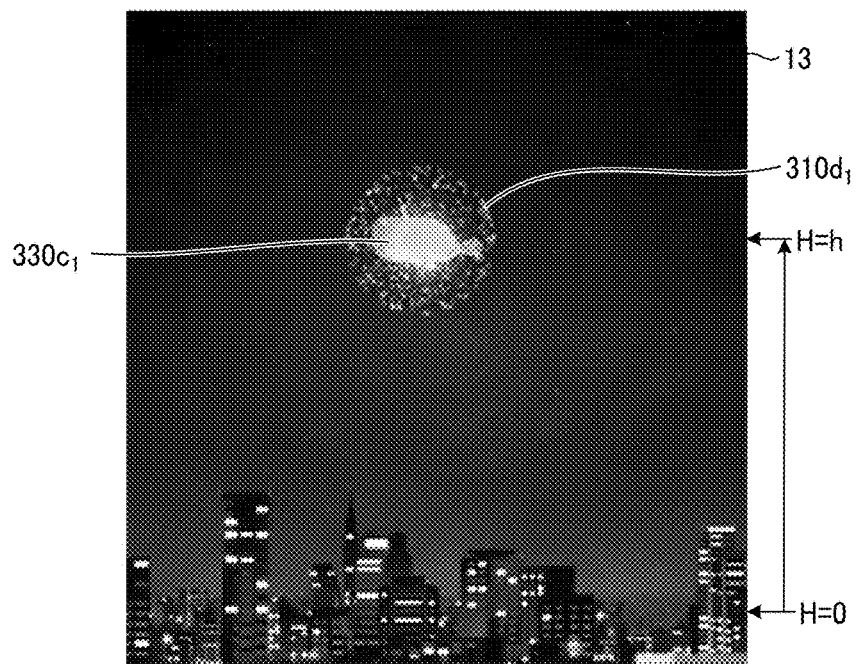

Hereinafter, a description is given of displaying the image 13 after FIG. 13B, with reference to the above-described flowchart of FIG. 12 and FIGS. 13C to 13H. After the display of the burst start image 323 as illustrated in FIG. 13C (step S206 in FIG. 12), the processes of steps S207a, S207b, and S207c in the flowchart of FIG. 12 are executed. As a result, as illustrated in FIG. 13D, at the position of the height h in the image 13, displayed are the combined image $330c_1$ obtained by superimposing the diffusion image 330a on the semitransparent user image 330b, and the firework image $310d1$ superimposed on the combined image $330c_1$. In this example, the firework image $310d_1$ is a firework image of the type "multi-break shells".

Figure 13E:
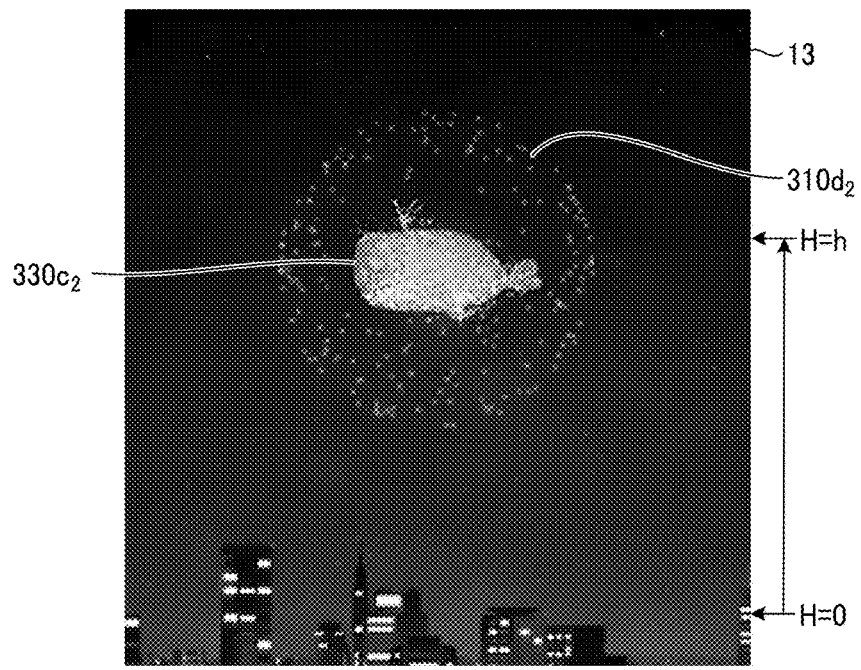

FIG. 13E illustrates an example of the image 13 displayed after several frames or ten-odd frames of a moving image from the state illustrated in FIG. 13D. Compared with the image 13 illustrated in FIG. 13D, in the image 13 illustrated in FIG. 13E, the semitransparent user image 330b becomes larger in accordance with the increase of the reduction value β, and the pixels of the diffusion image 330a are further diffused. As a result, the combined image $330c_2$ illustrated in FIG. 13E is larger than the combined image $330c_1$ illustrated in FIG. 13D. Also, the fireworks image $310d_2$ illustrated in FIG. 13E is larger than the firework image $310d_1$ illustrated in FIG. 13D, as dispersal of light spots progresses.

Figure 13F:
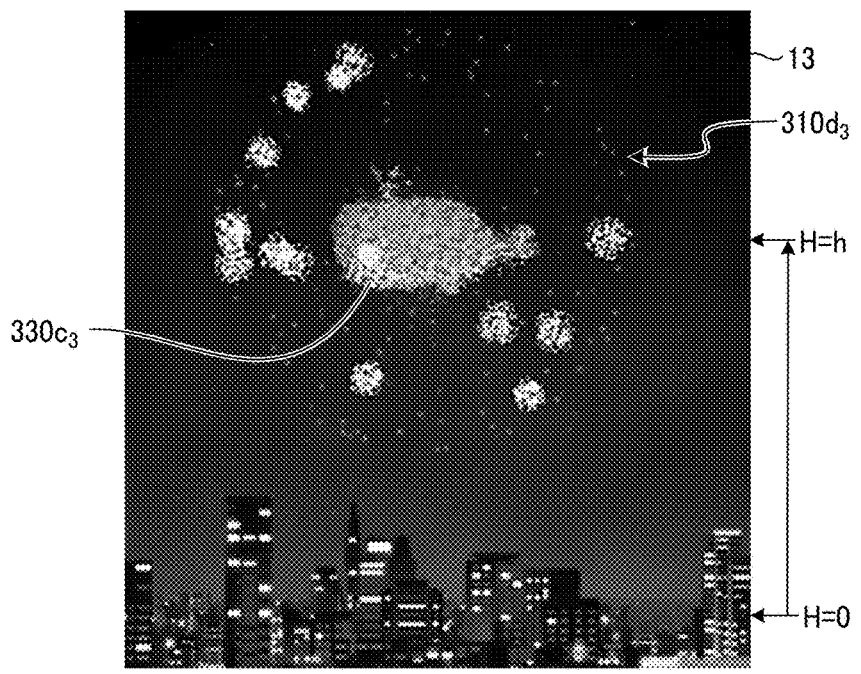

When a time corresponding to several frames or ten-odd frames has elapsed from the state of FIG. 13E, the semitransparent user image 330b fades out and disappears, and as illustrated in FIG. 13F, the combined image $330c_3$ includes only the diffusion image 330a. In addition, according to a sequence determined in advance for the firework type "multi-break shells", the firework image $310d_3$ is represented by plural floret images.

Figure 13G:
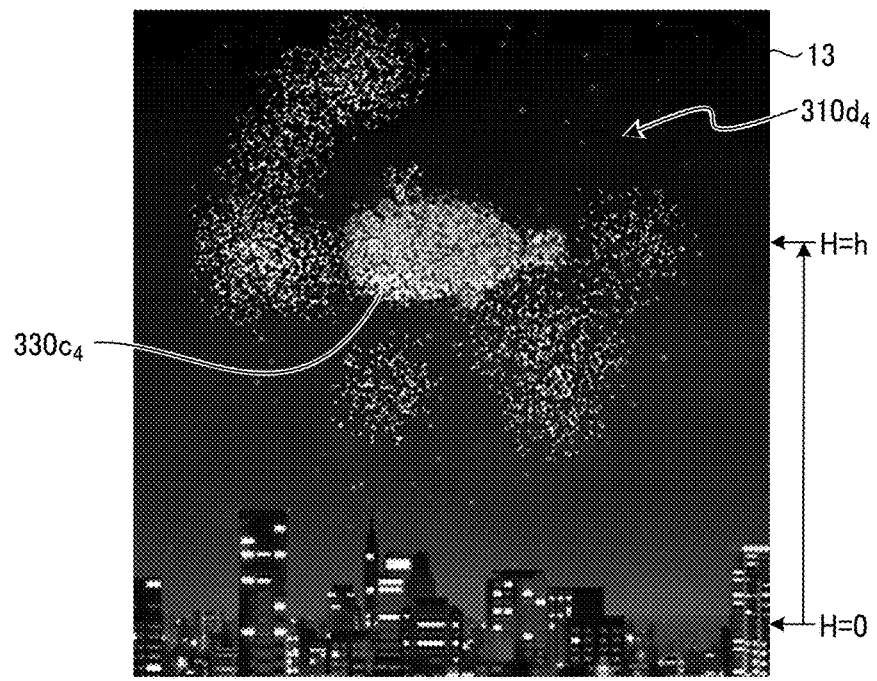
Figure 13H:

When a time corresponding to several frames or ten-odd frames has elapsed from the state of FIG. 13F, as illustrated in FIG. 13G, the pixels of the diffusion image 330a in the combined image $330c_4$ are further diffused, and the plural floret images as the firework image $310d_4$ are also further diffused. FIG. 13H illustrates an example of the image 13 displayed when a further time has elapsed from the state of FIG. 13G. In FIG. 13H, the firework image $310d_4$ disappears according to the sequence, for example, and the pixels of the diffusion image $330a$ in the combined image $330c_5$ are further diffused.

As described heretofore, in the first embodiment, the diffusion image $330a$ as animation obtained by diffusing one or more pixels extracted from pixels of the user image that is obtained based on the picture 22 drawn by a user is displayed together with the firework image simulating fireworks such that the position of the diffusion image $330a$ matches the position of the firework image. This enables the user to view animation as if the picture 22 drawn by him- or herself is shot up as fireworks. Further, in this animation, the diffusion image $330a$ is displayed as being superimposed on the semitransparent user image $330b$ generated by performing semi-transparency processing on the user image. This enables the user to easily recognize that the image displayed together with the firework image is an image based on the picture 22 drawn by him- or herself. Furthermore, since the semitransparent user image $330b$ is displayed for a very short time, it is possible to prevent the viewing of firework image from being disturbed.

Variation of First Embodiment:

Although a description is given heretofore of an example embodiment in which a set of the diffusion image $330a$, the semitransparent user image $330b$, and the firework image based on one user image is displayed in the image 13 projected on the screen 12, the present disclosure is not limited to this example. In another example, based on a plurality of user images, the display system $1a$ according to the first embodiment displays a plurality of combined images, each being obtained based on the diffusion image $330a$, the semitransparent user image $330b$, and the firework image, on the image 13.

Figure 19:
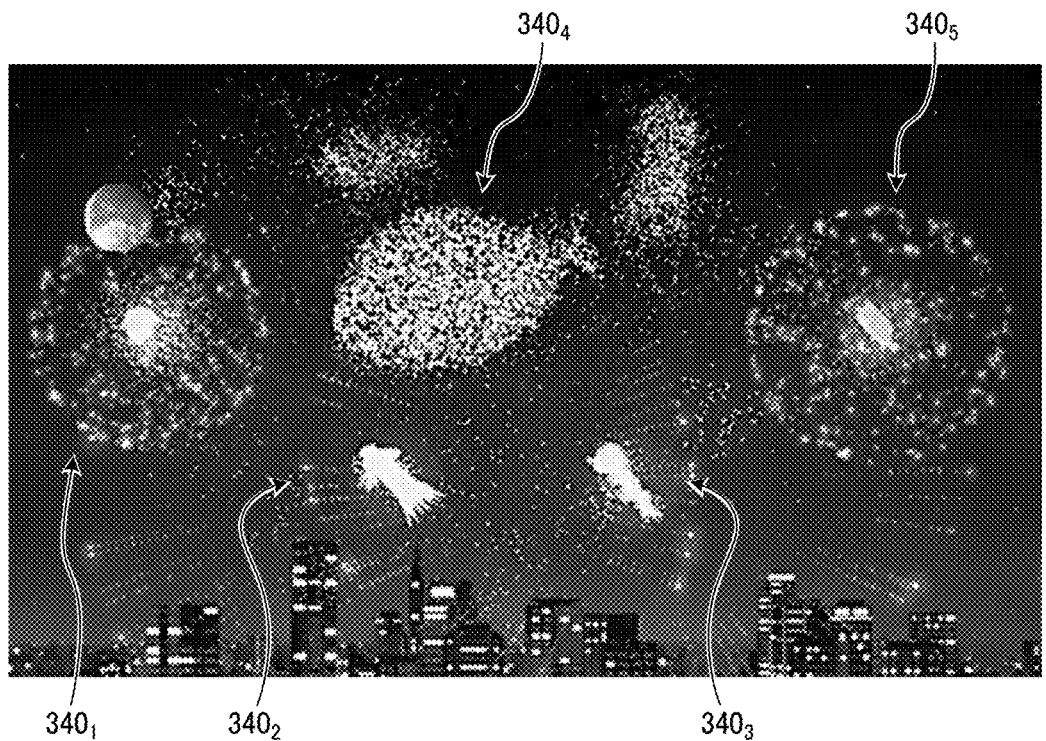
FIG. 19 is a diagram illustrating an example in which a plurality of composite images based on different user images are rendered in parallel, according to the first embodiment of the present disclosure.

FIG. 19 illustrates an example of the image 13 in which a plurality of composite images $340_1$, $340_2$, $340_3$, $340_4$ and $340_5$, each being a set of the diffusion image $330a$, the semitransparent user image $330b$, and the firework image based on the different user image, are rendered in parallel. The composite images $340_1$, $340_2$, $340_3$, $340_4$ and $340_5$ can be displayed at timings, for example.

Figure 20:
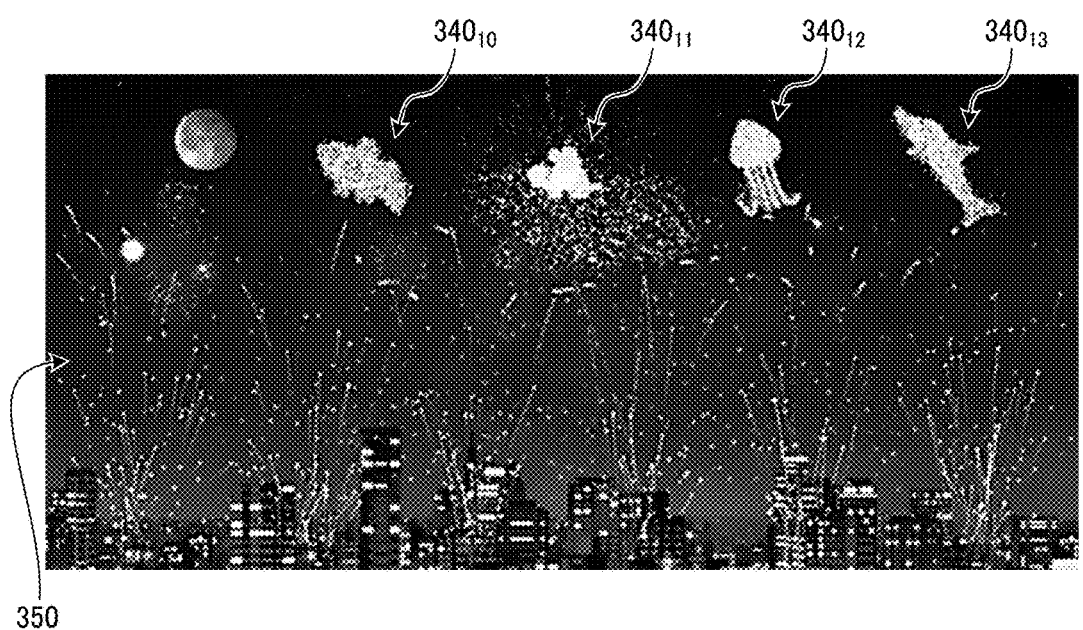
FIG. 20 is a diagram illustrating an example in which a plurality of composite images based on different user images and an image that simulates set fireworks rendered without using the user image are displayed together, according to the first embodiment of the present disclosure.

Further, FIG. 20 illustrates an example of the image 13 including a plurality of composite images $340_{10}$, $340_{11}$, $340_{12}$ and $340_{13}$, based on based on the different user images. In this example, an image 350 simulating set fireworks is displayed together with composite images $340_{10}$, $340_{11}$, $340_{12}$ and $340_{13}$. This image 350 is not based on the user image.

Second Embodiment

Hereinafter, a description is given of a second embodiment of the present disclosure. In the second embodiment, the composite image, which is obtained by superimposing the firework image on an image obtained by superimposing the diffusion image $330a$ on the semitransparent user image $330b$, is displayed in accordance with a preset scenario. The scenario includes one or more elements, each including a display pattern indicating a way in which the composite image is to be displayed. In the scenario, the order of the one or more elements is specified.

Since the display systems $1a$ and the display system $1b$ described in the first embodiment can be applied to the second embodiment, redundant descriptions of the system configuration, functions, and operation of displaying the composite image are omitted.

FIGS. 21A to 21E each illustrates an example of a display pattern according to which the composite image is displayed applicable to the second embodiment. Among the display patterns illustrated in FIGS. 21A to 21F, "waterfall" in FIG. 21A and "mine" in FIG. 21B are each a display pattern that does include display of the composite image. The display pattern "waterfall" in FIG. 21A is a display pattern simulating set fireworks called "Niagara", expressed by an array of sparks that flow downward from an elevated position. The display pattern "mine" FIG. 21B is a display pattern simulating sparks that blow up from one point.

The display patterns in FIGS. 21C to 21F are each a display pattern using a plurality of firework images. The composite image can be applied as each of the firework images.

The display pattern "Shakudama" in FIG. 21C is a display pattern simulating the shooting of fireworks called "Shakudama", which is aerial fireworks whose shell measures about 30 centimeters or more in diameter. In the example of FIG. 21C, the display pattern "Shakudama" includes a large firework image at the center surrounded by small firework images A, B, C, D and E. The composite image can be applied to each of those firework images A, B, C, D and E.

The display pattern "symmetry" in FIG. 21D is a display pattern simulating a plurality of firework shells that are arranged in a row and shot up in symmetrical order. For example, in the display pattern "symmetry", a plurality of firework images is animated such that firework shootings of a plurality of fireworks are rendered successively at different timings in a symmetrical order in a direction from the left- and rightmost to the center or from the center to the left- and rightmost. The display pattern "v-shaped shooting-up" in FIG. 21D is a display pattern simulating a plurality of firework shells that are arranged in a row and shot up simultaneously obliquely upward. For example, in the display pattern "v-shaped shooting-up", a plurality of firework images are animated such that firework shootings in the diagonally upward right direction and firework shootings in the diagonally upward left direction are rendered at the same timing. The display pattern "parallel shooting-up" in FIG. 21F is a display pattern simulating a plurality of firework shells that are arranged in a row and shot up at the same time. For example, in the display pattern "parallel shooting-up", a plurality of firework images arranged in a row are animated such that shootings of the plurality of fireworks in an upward direction are rendered at the same timing.

In addition to the display patterns illustrated in FIGS. 21A to 21F, examples of the display pattern further include a pattern according to which an animation of firework shooting is displayed using a single firework image. Examples of the display pattern further include a display pattern named "black", according to which no object is displayed. Examples of the display pattern further include a pattern named "fade-out black", according to which a predetermined processing (e.g., fade-out processing) is performed on an image (animation) displayed according to the immediately preceding display pattern.

FIGS. 22A and 22B are a table of an example scenario applicable to the second embodiment. In the table 1, an item "scenario" indicates a name of the scenario. Each scenario contains one or more records, each corresponding an element of the scenario.

In the table 1, each record or element included in the scenario includes items of "appearing fireworks and flow", "time (second)", "HD, number of fireworks shootings" and "wide, number of fireworks shootings".

The item "appearing fireworks and flow" describes the display pattern to be used in the element, and a firework type of firework image when the display pattern is a pattern using a firework image. Further, the item "appearing fireworks and flow" may be described by a combination of a plurality of display patterns. In this disclosure, a plurality of elements included in a scenario are executed according to an order in which they are described in the scenario.

The item "time (second)" describes the time during which the element is to be displayed in units of seconds. The item "HD, number of fireworks shootings" describes the type of fireworks of the firework image to be used in the element and the number of animations to be displayed using the firework image, in the case where the screen formed by the image 13 is the HD screen (see FIG. 1). For example, the description of "*Chrysanthemum* 3" (element of the second row of the scenario "Niagara") indicates that animation using the firework image of a firework type "*chrysanthemum*" is to be displayed three times. Further, the item "wide, number of fireworks shootings" describes the type of fireworks of the firework image to be used in the element and the number of animations to be displayed using the firework image, in the case where the screen formed by the image 13 is the wide screen (see FIG. 2). In the above-described element corresponding to "*chrysanthemum* 3", the item "wide, number of fireworks shootings" is set to "*chrysanthemum* 5", which is a different value from that of the HD screen.

A description is given hereinafter of the scenario "Niagara" in the table of FIGS. 22A and 22B as an example. Specifically, the following describes the display control according to the scenario "Niagara" in the case where the screen formed by the image 13 is HD screen. In the scenario "Niagara", the display pattern "black", which is the first element, is executed for 3 seconds, and then animation using the firework image of firework type "*chrysanthemum*", which is the second element, is displayed three times in 10 seconds. This animation using the firework image of firework type "*chrysanthemum*" is animation using the semitransparent user image 330b and the diffusion image 330a, which are generated based on the user image. Next, the display pattern "black", which is the third element, is executed for seconds.

Next, animation of the display pattern "waterfall", which is the fourth element, is displayed for 25 seconds. In this fourth element, in the latter 20 seconds of the display pattern "waterfall", an animation using the firework image of the firework type "Peony" is displayed five times in parallel to displaying of an animation of the display pattern "waterfall". This animation display using the firework image of firework type "Peony" is a normal shooting-up animation.

Lastly, the display pattern "fade-out black", which is the fifth element, is executed for 5 seconds, thereby each of firework images currently being displayed on the image 13 is faded out and disappears in 5 seconds.

As described heretofore, by performing the display control by plural elements in order according to the description of the scenario, a more varied display is achieved.

Figure 23:
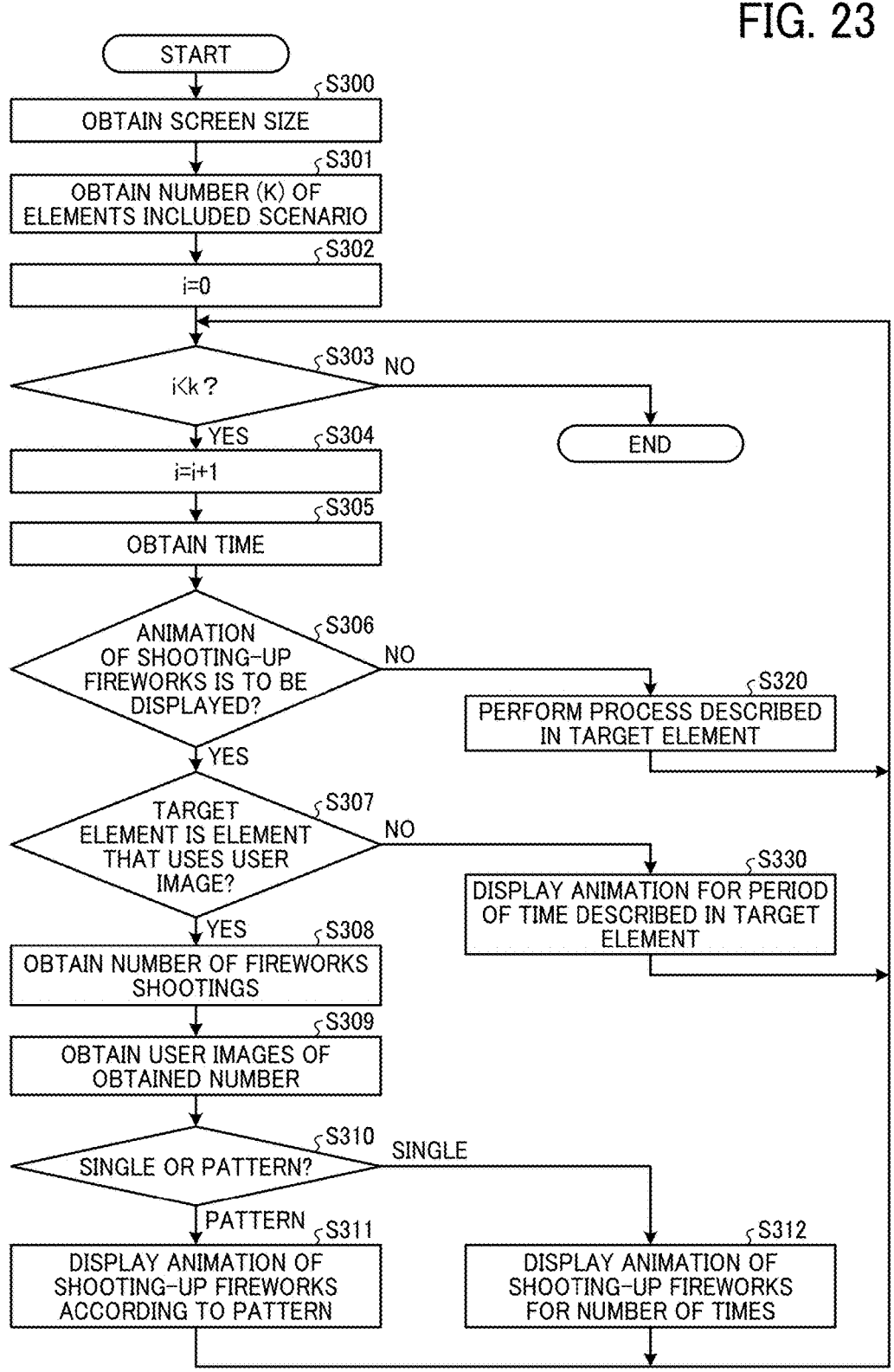
FIG. 23 is a flowchart illustrating an example of display control processing based on a scenario, according to the second embodiment of the present disclosure.

FIG. 23 is a flowchart illustrating an example of display control processing performed by the display control unit 127, according to the second embodiment. The scenarios illustrated in the table of FIGS. 22A and 22B is prepared in advance and stored in the storage 1004 (scenario storage unit), for example. Each of the plural scenarios may be individually stored in the storage 1004. Alternatively, a table including plural scenarios may be stored in the storage 1004 as illustrated in the table of FIGS. 22A and 22B. In response to designation of scenario, the display control unit 127 reads out the elements of the designated scenario from the storage 1004 and stores the scenario in the RAM 1002, for example.

In response to an instruction of execution of the designated scenario, the display control unit 127 determines whether the screen size is the HD screen or the wide screen in step S300. In the next step S301, the display control unit 127 acquires the number (k) of elements included in the designated scenario. In the next step S302, the display control unit 127 initializes a loop variable i to zero.

In the next step S303, the display control unit 127 determines whether "i<k" is satisfied for the loop variable i and the number of elements k. When the display control unit 127 determines that "i>k" is satisfied (S303: NO), the operation of the flowchart of FIG. 23 ends. As a result, the display control process for one scenario ends.

By contrast, based on the determination that "i<k" is satisfied (S303: YES), the display control unit 127 increments the loop variable i by 1 and acquires the i-th element in the designated scenario in the next step S304. Then, the operation proceeds to S305. In step S305, the display control unit 127 acquires a time described in the item "time (second)" in the i-th element. In the next step S306, the display control unit 127 determines whether a fireworks shooting-up animation is to be displayed based on the description in the item "appearing fireworks and flow" of the i-th element.

When the display control unit 127 determines that no fireworks shooting-up animation is to be displayed (S306: NO), the operation proceeds to step S320. More specifically, the display control unit 127 determines that no animation of fireworks shooting is to be displayed when the description in the item "appearing fireworks and flow" is any one of the display pattern "black" and "fade-out black". In step S320, the display control unit 127 executes the process of the display pattern "black" or "fade-out black" according to the time acquired in step S305. Upon completion of the process of step S320, the operation returns to step S303.

By contrast, when the display control unit 127 determines that a fireworks shooting-up animation is to be displayed (S306; YES), the operation proceeds to step S307. In step S307, the display control unit 127 determines whether the user image is to be used in the i-th element. For example, in the case where the description in the item "appearing fireworks and flow" of the i-th element indicates execution of only the display pattern "waterfall" or "mine", the display control unit 127 determines that the user image is not to be used in the i-th element.

Based on the determination that the user image is not to be used in the i-th element (S307: NO), the operation proceeds to step S330. In step S330, the display control unit 127 displays the fireworks shooting-up animation according to the time described in the item "time (second)" of the i-th element. Then, the operation returns to step S303.

When the display control unit 127 determines that the user image is to be used in the i-th element (S307: YES), the operation proceeds to step S308. In step S308, the display control unit 127 acquires the number of fireworks shootings described in the item "HD, number of fireworks shootings" of the i-th element. In the next step S309, the display control unit 127 acquires the n-number of the user images, where n is equal to the number of fireworks shootings acquired in step S308.

In the next step S310, the display control unit 127 determines, based on the description in the item "fireworks on fire and flow" of the i-th element, whether the animation of fireworks shooting using a single firework image is to be displayed or the animation of fireworks shooting using a plurality of firework images is to be displayed. For example, when there is a description indicating each display pattern illustrated in FIGS. 21A to 21F in the item "appearing fireworks and flow", the display control unit 127 determines that an animation using a plurality of firework images is to be displayed.

When the display control unit 127 determines that an animation using a plurality of firework images is to be displayed (S310: PATTERN), the operation proceeds to step S311. In step S311, the display control unit 127 displays a fireworks shooting-up animation in accordance with the display pattern described in the item "appearing fireworks and flow" of the i-th element. In this step, the display control unit 127 superimposes each of a plurality of firework images used for the display pattern on each of a plurality of combined image 330c generated based on the user images acquired in step S309 to display the fireworks shooting-up animation. It should be noted that the "number of fireworks shootings" corresponds to the number of firework images to be used in each of the display patterns illustrated in FIGS. 21C to 21F.

After the process of step S311, the operation returns to step S303.

When the display control unit 127 determines that an animation using a single firework image is to be displayed (S310: SINGLE), the operation proceeds to step S312. In step S312, the display control unit 127 displays a fireworks shooting-up animation using the firework image of the firework type described in the item "appearing fireworks and flow" of the i-th element for n times, where n is equal to the number of fireworks shootings acquired in step S308. In this step, the display control unit 127 superimposes the firework images of the firework type described in the item "appearing fireworks and flow" on each of a plurality of combined image 330c generated based on the user images acquired in step S309 to display the fireworks shooting-up animation for each time.

After the process of step S312, the operation returns to step S303.

Third Embodiment

Hereinafter, a description is given of a third embodiment of the present disclosure. In the third embodiment, the animation simulating the shooting of fireworks described in the first embodiment is displayed, for example, according to a user's action to the image 13 displayed on the screen 12.

Figure 24:
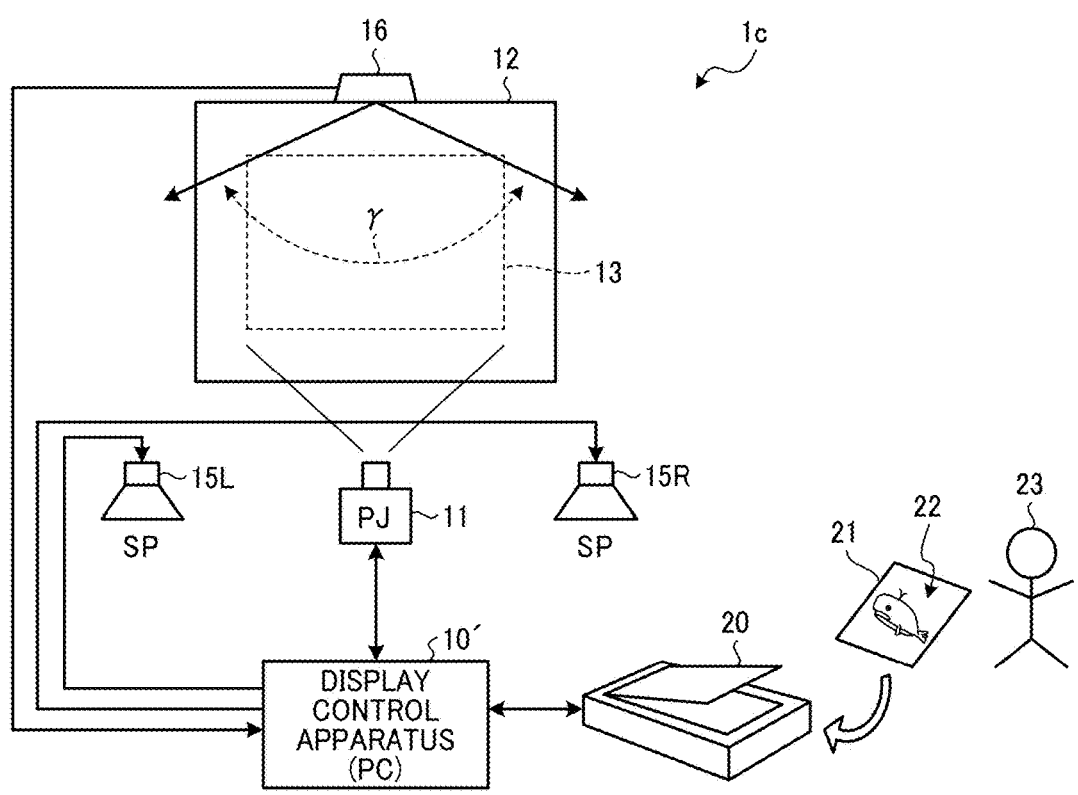
FIG. 24 is a block diagram illustrating an example configuration of a display system, according to a third embodiment of the present disclosure.

FIG. 24 is a schematic diagram illustrating an example configuration of a display system 1c according to the third embodiment of the present disclosure. When compared with the display system 1a according to the first embodiment as illustrated in FIG. 1, the display system 1c of FIG. 24 according to the third embodiment includes, for example, a detection sensor 16 in the vicinity of the screen 12. The detection sensor 16 detects an object, and the sensing result is output to the display control apparatus 10' according to the third embodiment.

The detection sensor 16 includes, for example, a light emitter and a light receiver. The light emitter emits infrared light, and the light receiver receives reflected light of the emitted infrared light. Thus, the detection sensor 16 senses presence of an object in a predetermined range γ and the position of the object. In another example, the detection sensor 16 may include a built-in camera. In this case, the detection sensor 16 senses a distance between the detection sensor 16 and a target object or the position of the target object based on an image of the target object included in a captured image acquired by the built-in camera. By installing the detection sensor 16 on a projection surface side of the screen 12, a user approaching the screen 12 can be detected.

Figure 25:
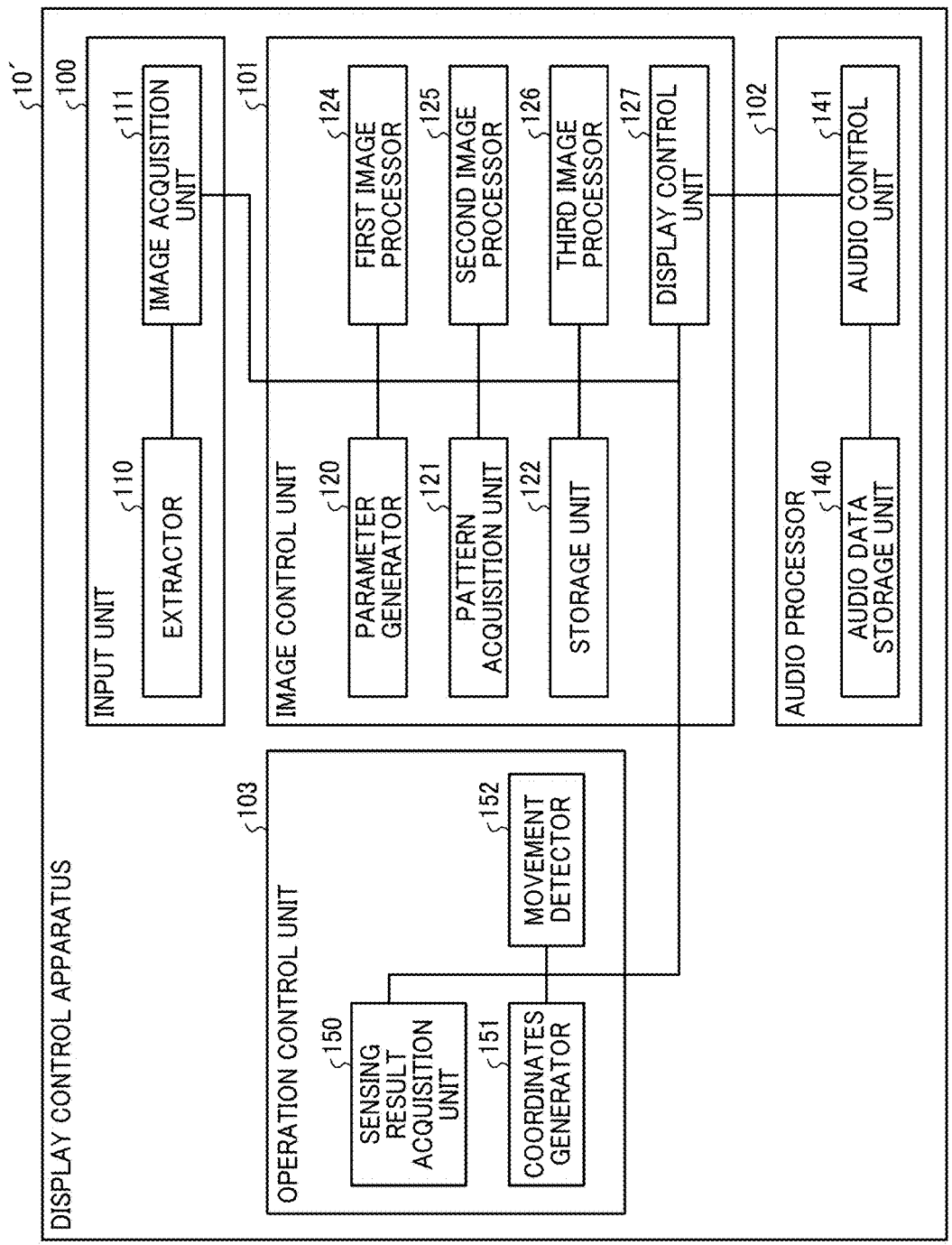
FIG. 25 is a block diagram illustrating an example of a functional configuration of a display control apparatus according to the third embodiment of the present disclosure.

FIG. 25 is a block diagram illustrating an example of a functional configuration of the display control apparatus 10' according to the third embodiment. In FIG. 25, the same reference numbers are allocated to elements having the same function as those of FIG. 6, and redundant descriptions thereof are omitted below.

Compared with the display control apparatus 10 according to the first embodiment described above with reference to FIG. 6, the display control apparatus 10' of FIG. 25 further includes, for example, an operation control unit 103. The operation control unit 103 includes, for example, a sensing result acquisition unit 150, a coordinates generator 151, and a movement detector 152. The sensing result acquisition unit 150 acquires the sensing result by the detection sensor 16.

The coordinate generator 151 associates a position of an object indicated by the sensing result of the detection sensor 16 acquired by the sensing result acquisition unit 150 with coordinates on the image 13 displayed on the screen 12, to generate coordinates on the image 13 according to the position of the object detected by the detection sensor 16. The movement detector 152 acquires the coordinates generated by the coordinates generator 151 at regular time intervals to obtain a difference between the acquired coordinates. The movement detector 152 detects movement of the object based on the difference. For example, when the difference is within a predetermined range, the movement detector 152 determines that the object is not moving.

The sensing result acquired by the sensing result acquisition unit 150, the coordinates acquired by the coordinate generator 151, and the movement detection result detected by the movement detector 152 are input to the display control unit 127. Based on these sensing result, coordinates and movement detection result, the display control unit 127 recognizes a tap operation, a drag operation, and a drop operation. The tap operation refers to an operation of designating a predetermined position in the image 13 displayed on the screen 12 and canceling the designation immediately thereafter. The drag operation refers to an operation of continuously moving the designated position in the image 13. The drag operation refers to an operation of canceling the designation of position after the drag operation. An operation of performing the drag operation and the drop operation without stopping is referred to as a drag-and-drop operation.

Figure 26A:
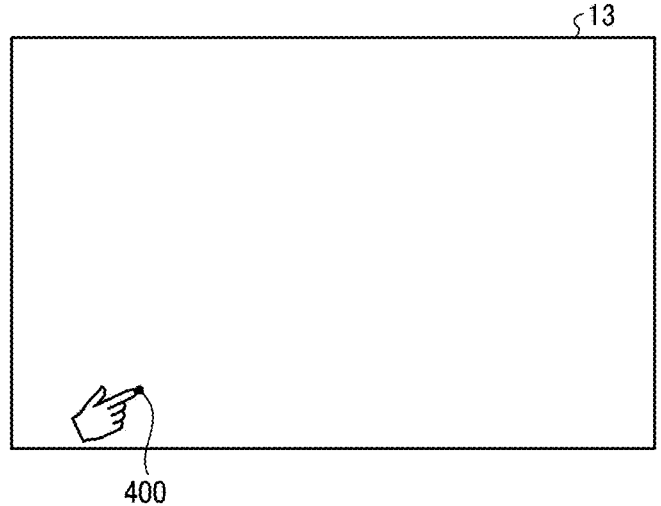
FIGS. 26A to 26C illustrate an example in which an animation simulating the shooting of fireworks is displayed according to a tap operation by a user, according to the third embodiment of the present disclosure.
Figure 26B:
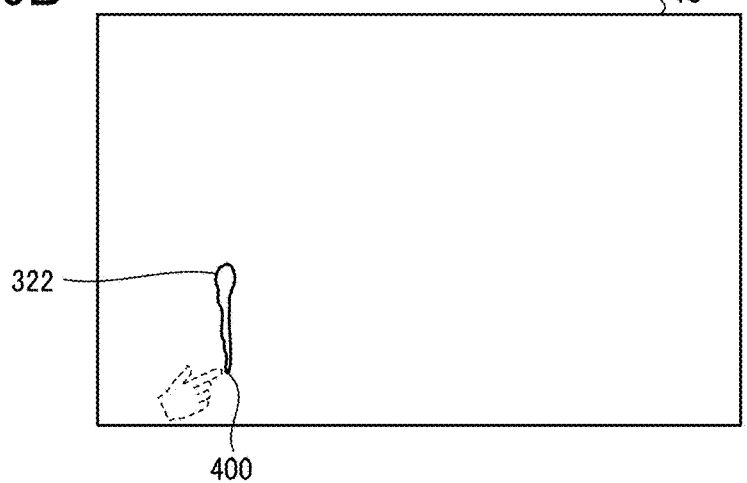
Figure 26C:
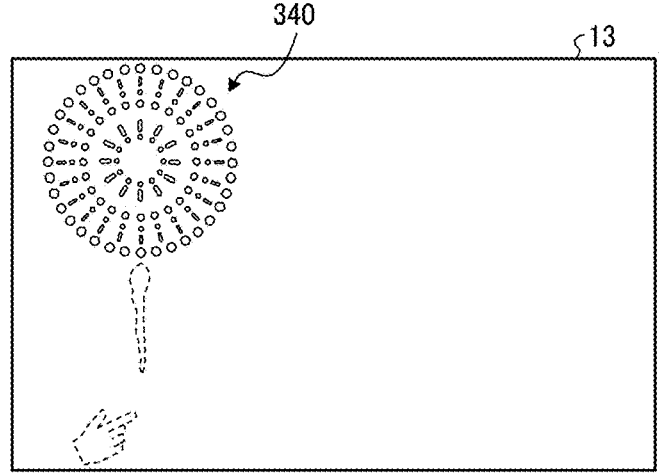

FIGS. 26A to 26C illustrate an example in which an animation simulating the shooting of fireworks is displayed according to a tap operation by a user, according to the third embodiment. FIG. 26A illustrates an example in which the user performs a tap operation at a position 400 in the image 13 projected on the screen 12 by the user's finger, for example. It should be noted that the user does not have to directly touch the screen 12 with the user's finger or the like in the tap operation or the drag-and-drop motion. For example, the user only has to bring his or her finger close to a position where the detection sensor 16 provided in the vicinity of the screen 12 can sense the finger.

FIG. 26B illustrates a state in which designation of the position 400 is canceled by the tap operation of FIG. 26A. When the position 400 is designated by the tap motion, the animation display of the firework shooting-up image 322 is started with the position 400 as a starting point. FIG. 26C illustrates an example in which an animation by the composite image 340, which is obtained by superimposing the diffusion image 330a on the semitransparent user image 330b generated based on the user image, then further superimposing the firework image on the combined image of the diffusion image 330a and the semitransparent user image 330b, is displayed according to the display of the firework shooting-up image 322.

For example, the display control unit 127 extracts the most recently stored user image from the folder "DisplayingObject" (see FIG. 11) to display the composite image 340 as illustrated in FIG. 26C.

Figure 27A:
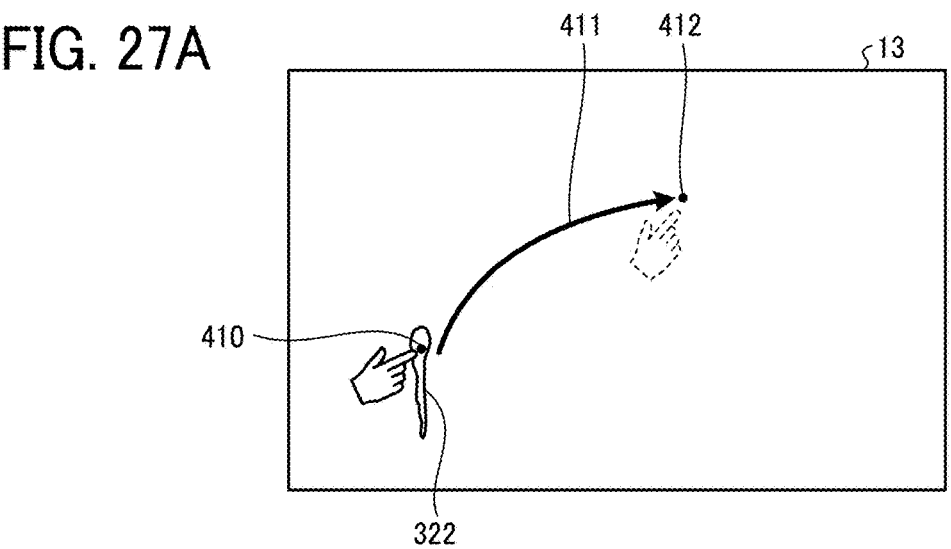
FIGS. 27A to 27C illustrate an example in which an animation simulating the shooting of fireworks is displayed according to a drag-and-drop operation by a user, according to the third embodiment of the present disclosure.
Figure 27B:
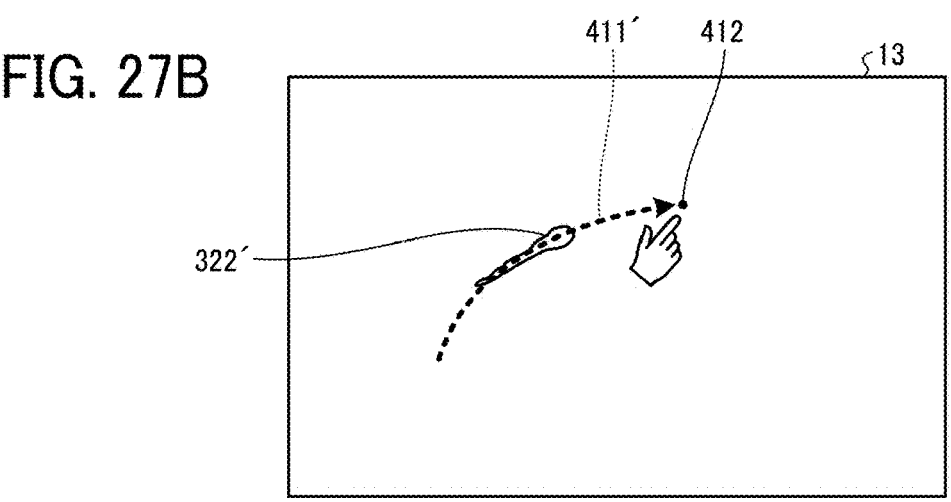
Figure 27C:
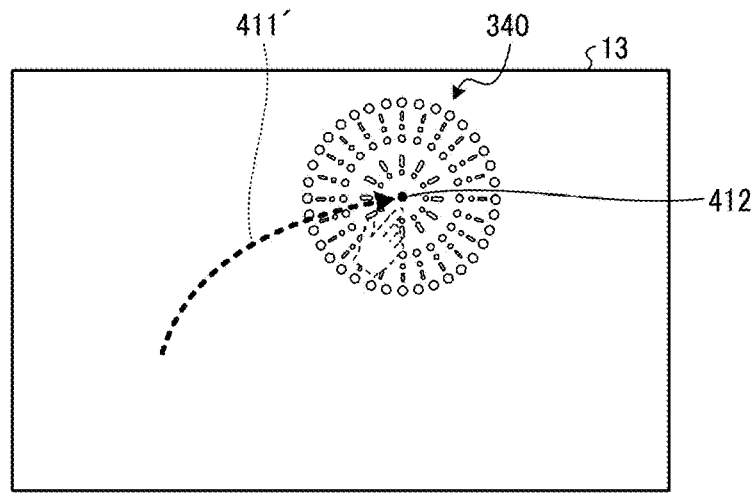

FIGS. 27A to 27C illustrate an example in which an animation simulating the shooting of fireworks is displayed according to a drag-and-drop operation by a user, according to the third embodiment. As illustrated in FIG. 27A, a user performs a drag-and-drop operation of firstly designating a position 410 in the image 13, then moving the designated position along a path 411, and finally cancelling the destination of position at a position 412. When the position 410 is designated by the user's finger or the like, display of the firework shooting-up image 322 is started.

As illustrated in FIG. 27B, the firework shooting-up image 322' moves according to the movement of the designated position (fourth image). More specifically, the firework shooting-up image 322' is displayed of which direction is changed to a trajectory 411' of the movement of the designated position. When the designation of position is canceled at the position 412 and the drag-and-drop operation ends, as illustrated in FIG. 27C, an animation of the composite image 340 is displayed with the position 412 as the center.

As described heretofore, according to the third embodiment, the animation of the composite image 340 generated based on the user image is displayed based in accordance with the user's action to the image 13 displayed on the screen 12. Therefore, the display system 1c according to the third embodiment provides an interactive environment to the user. Also, this enables the user to obtain more advanced entertainment.

In the above, a description is given of an example where the third embodiment is applied to the display system 1a using the HD screen as illustrated in FIG. 1 of the first embodiment. In another example, the third embodiment may also be applied to the display system 1b using the wide screen as illustrated in FIG. 2 of the first embodiment. In this case, it is preferable to provide the detection sensor 16 for each of the images $13_1$, $13_2$ and $13_3$, for example.

In addition, although the third embodiment may be implemented independently, the third embodiment may be implemented in combination with the first embodiment and the second embodiment.

According to one or more embodiments of the present disclosure, it possible to give more sophisticated variation in movement to a displayed image drawn by a user.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. A display control apparatus comprising:
circuitry configured to:
receive a user image input to the display control apparatus, the user image including a portion drawn by a user;
generate a first image based on the user image, the first image being obtained by diffusing one or more pixels of a plurality of pixels defining the user image in time series;
generate a second image based on the user image, the second image is an image based on which a figure pattern of the user is identifiable and that includes a contour of the user image;
display the second image at one position on a screen; and
display the first image at a counter position of the one position displaying the second image on the screen, the first image being superimposed on the second image.

2. The display control apparatus of claim 1, wherein the circuitry generates the second image such that a background image that is displayed as a background on the screen is viewable through the second image.

3. The display control apparatus of claim 1, wherein
the circuitry is further configured to generate a third image representing a plurality of light spots being dispersed in time series from a burst point; and
the third image is displayed on the screen using the one position as the burst point.

4. The display control apparatus of claim 3, wherein
the circuitry is further configured to:
extract a feature value from the user image; and
generate a parameter for determining a display attribute of the third image based on the extracted feature value.

5. The display control apparatus of claim 4, wherein
the third image includes a plurality of third images of different types, each representing a different pattern of dispersal of the plurality of light spots, and
the circuitry selects one of the plurality of third images based on the generated parameter.

6. The display control apparatus of claim 4, wherein the circuitry determines, based on the generated parameter, at least one of a height of the one position measured from a bottom side of the screen, a size of the dispersal of the light spots in the third image, and a degree of the dispersal of the light spots in the third image.

7. The display control apparatus of claim 4, wherein
the circuitry further configured to:
output a burst sound in accordance with the dispersal of the plurality of light spots from the burst point in the third image; and
determine a volume of the burst sound based on the generated parameter.

8. The display control apparatus of claim 4, wherein the circuitry determines a size of the diffusion of the one or more pixels of the first image based on the generated parameter.

9. The display control apparatus of claim 3, further comprising:
a memory to store a scenario in which one or more elements are described in a specific order, each of the one or more elements including a display pattern indicating how a composite image is to be displayed, the composite image including the third image displayed with display of the first image and the second image,
wherein the circuitry acquires the one or more elements from the scenario one by one in accordance with the specific order, and displays the composite image in accordance with the display pattern included in the acquired one or more elements.

10. The display control apparatus of claim 9, wherein the one or more elements described in the scenario includes an element indicating a display pattern of not displaying the composite image.

11. The display control apparatus of claim 9, wherein the one or more elements described in the scenario includes an element indicating a display pattern of displaying a plurality of composite images in combination.

12. The display control apparatus of claim 9, wherein the one or more elements described in the scenario includes an element indicating a display pattern of displaying the composite image for a specific number of times.

13. The display control apparatus of claim 3, wherein the circuitry is further configured to:
based on a detection result acquired by a detection sensor that detects an operation of designating a position on the screen and an operation of cancelling the operation of designation the position, generate a coordinate in the screen corresponding to the position designated by the operation of designating the position; and
in response to detection of the cancellation of the operation of designating the position, display a composite image on the screen at the coordinate where the cancellation of the operation of designating the position is performed, the composite image including the third image displayed with display of the first image and the second image.

14. The display control apparatus of claim 13,
wherein the circuitry is further configured to:
detect movement of an object based on the coordinate; and
in response to detection of the movement exceeding a given level, display a fourth image moving in accordance with the detected movement exceeding the given level on the screen.

15. A non-transitory computer readable medium storing a program that, when executed by a computer, cause the computer to perform a display method, the program comprising:
a first code segment executable to receive a user image input to a display control apparatus, the user image including a portion drawn by a user;
a second code segment executable to generate a first image based on the user image, the first image being obtained by diffusing one or more pixels of a plurality of pixels defining the user image in time series;
a third code segment executable to generate a second image based on the user image, the second image is an image based on which a figure pattern of the user is identifiable and that includes a contour of the user image;
a fourth code segment executable to display the second image at one position on a screen; and
a fifth code segment executable to display the first image at a counter position of the one position displaying the second image on the screen, the first image being superimposed on the second image.

16. A display control method, comprising:
receiving a user image input to a display control apparatus, the user image including a portion drawn by a user;
generating a first image based on the user image, the first image being obtained by diffusing one or more pixels of a plurality of pixels defining the user image in time series;
generating a second image based on the user image, the second image is an image based on which a figure pattern of the user is identifiable and that includes a contour of the user image;
displaying the second image at one position on a screen; and
displaying the first image at a counter position of the one position displaying the second image on the screen, the first image being superimposed on the second image.

* * * * *